United States Patent
Kakutani

[19]

[11] Patent Number: 6,031,627
[45] Date of Patent: Feb. 29, 2000

[54] PRINTING SYSTEM AND IMAGE RECORDING METHOD

[75] Inventor: Toshiaki Kakutani, Suwa, Japan

[73] Assignee: Seiko Epson Corporation, Tokyo, Japan

[21] Appl. No.: 08/941,040

[22] Filed: Sep. 30, 1997

[30] Foreign Application Priority Data

Oct. 1, 1996 [JP] Japan ..................................... 8-281332
Jul. 23, 1997 [JP] Japan ..................................... 9-214110

[51] Int. Cl.[7] ............................. H04N 1/405; H04N 1/52
[52] U.S. Cl. .......................... 358/1.9; 358/535; 358/457; 358/459; 358/298
[58] Field of Search .......................... 358/1.9, 534, 535, 358/456, 457, 458, 459, 298

[56] References Cited

U.S. PATENT DOCUMENTS 4,604,654  8/1986  Sakurada et al. ....................... 358/298

FOREIGN PATENT DOCUMENTS 61-108254  5/1986  Japan .
2-215541   8/1990  Japan .

*Primary Examiner*—Scott Rogers
*Attorney, Agent, or Firm*—Oblon, Spivak, McClelland, Maier & Neustadt, P.C.

[57] ABSTRACT

In a printer for printing an image by a distribution of dots having different densities per unit area or dots having different hues, the structure of the present invention accurately determines the on/off state of the different dots and ensuring high quality of printing. Recording ratios Rn and Rt of deep dots and light dots corresponding to input tone data DS in a target pixel are read from a map representing the relationship between the recording ratios and the tone data. The systematic dither method is adopted to determine formation or non-formation of a deep dot in the target pixel. This method compares the recording ratio Rn of deep dots with a threshold value Dref corresponding to the target pixel and read from a threshold matrix TM. In case that a deep dot is not formed, the recording ratio Rt of light dots is corrected by adding the recording ratio Rn of deep dots and subsequently compared with the same threshold value Dref to determine formation or non-formation of a light dot in the target pixel. The structure of the present invention uses only one threshold matrix to realize desired recording ratios without causing any over lap of deep dots with light dots. This structure is also applicable to dots having different hues. In this case, one threshold matrix is used to determine the on/off state of dots having different hues without causing any interference of the different hues.

24 Claims, 21 Drawing Sheets

Fig. 10

INK COMPOSITIONS AND PROPERTIES

| | | C1 | C2 | M1 | M2 | Y | Bk |
|---|---|---|---|---|---|---|---|
| DYES | Directblue199 | 3.6 | 0.9 | | | | |
| | Acidred289 | | | 2.8 | 0.7 | | |
| | Directyellow86 | | | | | 1.8 | |
| | Foodblack2 | | | | | | 4.8 |
| DIETHYLENE GLYCOL | | 30 | 35 | 20 | 25 | 30 | 25 |
| SURFINOL 465 | | 1 | 1 | 1 | 1 | 1 | 1 |
| WATER | | 65.4 | 63.1 | 76.2 | 73.3 | 67.2 | 69.2 |
| VISCOSITY (mPa·s) | | 3.0 | 3.0 | 3.0 | 3.0 | 3.0 | 3.0 |

RECORDING RATIO Rn OF DEEP DOTS

THRESHOLD MATRIX TM (4×4)

ON/OFF STATE OF DEEP DOTS

CORRECTED RECORDING RATIO RR OF LIGHT DOTS

ON/OFF STATE OF LIGHT DOTS

RECORDING RATIO Rn OF DEEP DOTS

+

RECORDING RATIO Rt OF LIGHT DOTS

DEEP DOTS

LIGHT DOTS

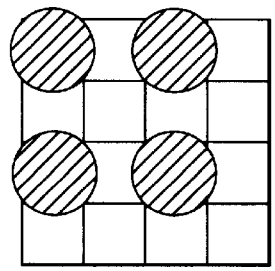
FIG. 16A
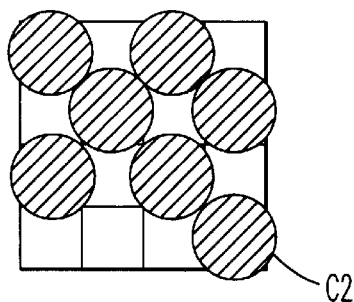
FIG. 16B
FIG. 16C
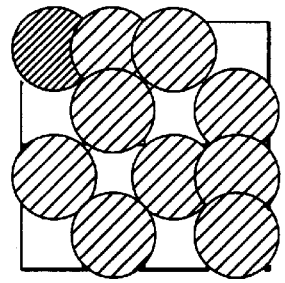
FIG. 16D
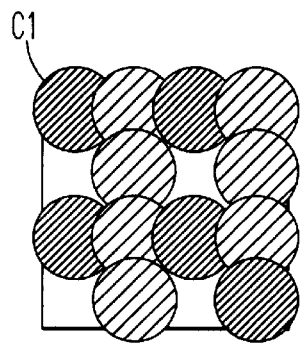
FIG. 16E
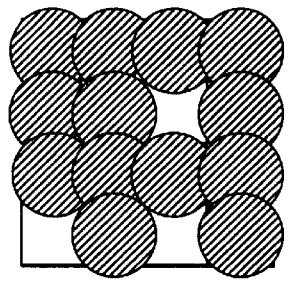
FIG. 16F
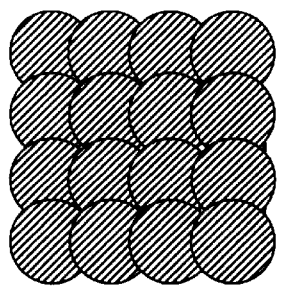
FIG. 16G

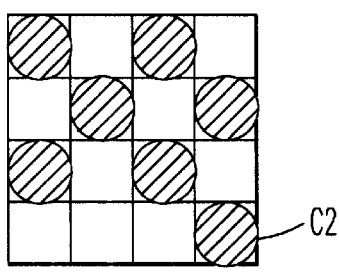
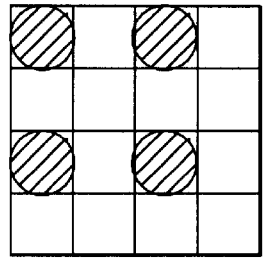
*FIG. 17A*  *FIG. 17B*
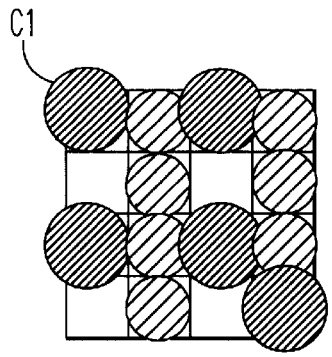
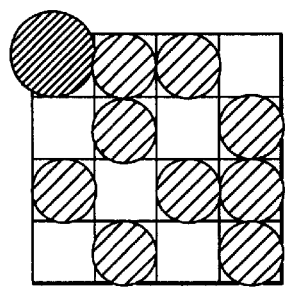
*FIG. 17C*  *FIG. 17D*
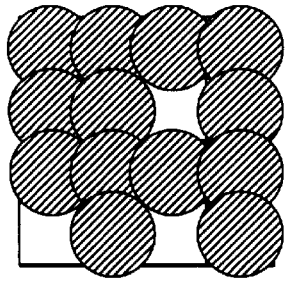
*FIG. 17E*  *FIG. 17F*
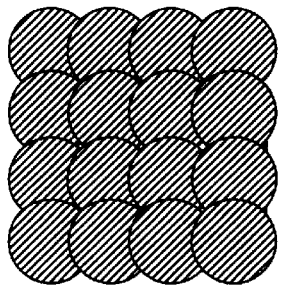
*FIG. 17G*

| RK | | | | | RC | | | | | RM | | | |
|---|---|---|---|---|---|---|---|---|---|---|---|---|---|
| 5 | 4 | 7 | 14 | | 2 | 4 | 3 | 11 | | 2 | 3 | 4 | 6 |
| 3 | 4 | 6 | 5 | | 10 | 6 | 2 | 5 | | 9 | 5 | 2 | 4 |
| 1 | 7 | 7 | 8 | | 9 | 3 | 7 | 6 | | 8 | 2 | 6 | 6 |
| 4 | 5 | 9 | 11 | | 4 | 1 | 4 | 10 | | 5 | 2 | 3 | 11 |

| RK+RC | | | | | RK+RM | | | |
|---|---|---|---|---|---|---|---|---|
| 7 | 8 | 10 | 25 | | 7 | 7 | 11 | 20 |
| 13 | 10 | 8 | 10 | | 12 | 9 | 8 | 9 |
| 10 | 10 | 14 | 14 | | 9 | 9 | 13 | 14 |
| 8 | 6 | 13 | 21 | | 9 | 7 | 12 | 22 |

DK
DC
DM

| TM | | | | | UM | | | |
|---|---|---|---|---|---|---|---|---|
| 1 | 9 | 3 | 11 | | 16 | 8 | 14 | 6 |
| 13 | 5 | 15 | 7 | | 4 | 12 | 2 | 10 |
| 4 | 12 | 2 | 10 | | 13 | 5 | 15 | 7 |
| 16 | 8 | 14 | 6 | | 1 | 9 | 3 | 11 |

PRINTING SYSTEM AND IMAGE RECORDING METHOD

BACKGROUND OF THE INVENTION

1. Field of the Invention

The present invention relates to a printing system having a head, from which inks are dischargeable to form at least two different dots having different characteristics, for example, at least two different dots having different densities per unit area or at least two different dots having different hues, on an object, and recording a multi-tone image by a distribution of the at least two different dots. The present invention also pertains to an image recording method for recording a multi-tone image in such a printing system and a recording medium for storing a program to cause a computer to realize the image recording method.

2. Description of the Related Art

Color printers, in which a plurality of color inks are discharged from a head, are widely used as an output device of a computer that records a multi-color, multi-tone image processed by the computer. Several methods are applicable to print a multi-color, multi-tone image with three color inks, cyan, magenta, and yellow (CMY). One method is a technique adopted in the conventional printers. This technique expresses the tone of a printed image by the density of dots (frequency of appearance of dots per unit area) while fixing the size of dots formed on a sheet of paper by a spout of ink. Another method adjusts the diameter of dots formed on a sheet of paper, in order to vary the density of dots per unit area. Although the advanced processing of the head for forming ink particles has been improving the density of dots formable per predetermined length or the variable range of the dot diameter, the printers have only the limited printing density or the resolution to 300 through 720 dpi and the limited particle diameter to several ten microns. The resolution of printers is significantly lower than the resolution of silver photography, which has reached several thousand dpi on the film.

Dots are sparsely formed in an area of low image density, that is, in an area of low density of dots to be printed. This increases the degree of granularity and makes the dots conspicuous. A printing system and a method utilizing inks of different densities have been proposed to improve the printing quality. The proposed technique utilizes a high-density ink and a low-density ink for a certain color and regulates discharge of these inks, thereby realizing print with an excellent tone expression. By way of example, a method of and an apparatus for recording a multi-tone image are disclosed in JAPANESE PATENT LAYING-OPEN GAZETTE No. 61-108254. The disclosed technique provides a head for forming deep dots and light dots for a certain color and regulates the number and overlap of deep dots and light dots formed in a predetermined dot matrix according to input density information of an image, so as to record a multi-tone image.

The proposed printing system utilizing inks of different densities, however, does not give any specific idea on the allocation of high-density ink and low-density ink to the input tone signals of an original image. Inks of different densities are simply allocated in the order of densities to the input tone signals of the image (for example, FIG. 9 in JAPANESE PATENT LAYING-OPEN GAZETTE No. 2-215541).

The on/off state of two different dots may be determined independently. This is attained, for example, by using two completely different dither matrices or by shifting either one or both of the horizontal and vertical positions in one dither matrix. These conventional methods ensure good dispersibility of the respective dots, but dot not realize the optimum dispersibility of these dots as a whole, which results in output images having a high degree of granularity and unevenness. Similar problems arise in any dots having different characteristics other than the dots having different densities, for example, at least two different dots formed by inks of different hues and at least two different dots having different sizes.

SUMMARY OF THE INVENTION

The object of the present invention is thus to realize the good dispersibility of at least two different dots having different characteristics as a whole and thereby give a high-quality output image.

More concretely, the object of the present invention is to adopt the dither method independently for at least two different dots having different characteristics (for example, dots formed by at least two inks having different densities or dots formed by at least two inks having different hues) and make tone signals of an original image correspond to these at least two different dots, thereby enabling a head to discharge Inks and form the at least two different dots.

At least part of the above and the other related objects is realized by a printing system having a head, from which inks are dischargeable to record at least two different dots having different characteristics on an object, and recording a multi-tone image by a distribution of the at least two different dots. The printing system includes: input means for successively receiving a tone signal of each pixel included in an image to be printed; recording ratio setting means for specifying recording ratios of the at least two different dots having different characteristics with respect to each pixel, based on the input tone signal; first dot formation determination means for comparing the recording ratio specified for a first dot among the at least two different dots having different characteristics with a threshold value corresponding to each pixel and read from a threshold matrix, which corresponds to a dither pattern provided in advance, in order to determine whether or not the first dot is to be formed at a position corresponding to each pixel; second dot formation determination means for comparing the recording ratio specified for a second dot among the at least two different dots having different characteristics with the threshold value of the threshold matrix, in order to determine whether or not the second dot is to be formed at a position corresponding to each pixel, except positions corresponding to the pixels where formation of the first dot has been determined; and head driving means for driving the head to form the at least two different dots having different characteristics, based on the results of determination by the first dot formation determination means and the second dot formation determination means.

The present invention is also directed to an image recording method for recording a multi-tone image by a distribution of at least two different dots having different characteristics in a printing system with a head, from which inks are dischargeable to record the at least two different dots having different characteristics on an object. The image recording method includes the steps of:

(a) successively receiving a tone signal of each pixel included in an image to be printed;

(b) specifying recording ratios of the at least two different dots having different characteristics with respect to each pixel, based on the input tone signal;

(c) comparing the recording ratio specified for a first dot among the at least two different dots having different characteristics with a threshold value corresponding to each pixel and read from a threshold matrix, which corresponds to a dither pattern provided in advance, in order to determine whether or not the first dot is to be formed at a position corresponding to each pixel;

(d) comparing the recording ratio specified for a second dot among the at least two different dots having different characteristics with the threshold value of the threshold matrix, in order to determine whether or not the second dot is to be formed at a position corresponding to each pixel, except positions corresponding to the pixels where formation of the first dot has been determined; and (e) driving the head to form the at least two different dots having different characteristics, based on the results of determination in the step (c) and the step (d).

In the printing system and the image recording method of the present invention, recording ratios of the at least two different dots having different characteristics are specified with respect to each pixel, based on the input tone signal. The recording ratio specified for a first dot among the at least two different dots having different characteristics is compared with a threshold value corresponding to each pixel and read from a threshold matrix, which corresponds to a dither pattern provided in advance, in order to determine whether or not the first dot is to be formed at a position corresponding to each pixel. The recording ratio specified for a second dot among the at least two different dots having different characteristics is then compared with the same threshold value of the threshold matrix, in order to determine whether or not the second dot is to be formed at a position corresponding to each pixel, except positions corresponding to the pixels where formation of the first dot has been determined. The head is then driven to form the at least two different dots having different characteristics, based on the results of determination.

This structure enables the on/off state of a dot in each pixel to be determined through the comparison with the threshold matrix based on the dither method, thereby realizing the high-speed halftone processing. The identical threshold matrix can be used for at least two different dots having different characteristics.

Although the dither matrix attaining good dispersibility is selected in the above description, any desired dither matrix may be selected according to the required characteristics of the dot distribution.

The present invention is further directed to a computer program product for driving a head of a printing system, from which inks are dischargeable to record at least two different dots having different characteristics on an object. The computer program product comprising:

a computer readable medium; and computer program code means stored on said computer readable medium, said computer program code means storing at least part of a program for recording a multi-tone image by a distribution of said at least two different dots, said computer program code means comprising:

first program code means for causing said computer to realize:

second program code means for successively receiving a tone signal of each pixel included in an image to be printed;

third program code means for specifying recording ratios of said at least two different dots having different characteristics with respect to said each pixel, based on said input tone signal;

forth program code means for comparing the recording ratio specified for a first dot among said at least two different dots having different characteristics with a threshold value corresponding to said each pixel and read from a threshold matrix, which corresponds to a dither pattern provided in advance, in order to determine whether or not said first dot is to be formed at a position corresponding to said each pixel; and fifth program code means for comparing the recording ratio specified for a second dot among said at least two different dots having different characteristics with the threshold value of said threshold matrix, in order to determine whether or not said second dot is to be formed at a position corresponding to said each pixel, except positions corresponding to the pixels where formation of said first dot has been determined.

Available examples of such a recording medium include ROMs, RAMS, flexible disks, CD-ROMs, memory cards, and other magneto-optic disks. The recording media also include paper with bar codes recorded thereon and punched cards with tiny holes made according to a predetermined coding system. The program for determining formation or non-formation of dots is registered in the recording medium. In case that a program for controlling a spout of ink from the head based on the determination is provided in advance in the form of firmware in the printer or the computer, there is no need of storing such a program in the recording medium. When such firmware is not provided in the printer or the computer or when it is desirable to provide such a program independently, the program for outputting signals to control a spout of ink from the head based on the determination of dot formation may also be registered in the recording medium. These programs may be stored in a plurality of separate recording media, instead of one recording medium, and may be registered after a predetermined coding or compressing process.

The program registered in such a recording medium is read and carried out by the computer. The computer executes the program and determines formation or non-formation of dots. The head included in the printing system is driven, based on the results of determination. This realizes the image recording method discussed above.

In order to determine whether or not the second dot is to be formed at a position corresponding to the each pixel, except positions corresponding to the pixels where formation of the first dot has been determined, one preferable structure of the printing system or the image recording method of the present invention corrects the recording ratio of the second dot with the recording ratio of the first dot used for the comparison, and compares the corrected recording ratio with the threshold value of the threshold matrix.

The correction may be carried out by adding the recording ratio of the first dot used for the comparison to the recording ratio of the second dot or by subtracting a value corresponding to the recording ratio of the first dot used for the comparison from the corresponding threshold value of the threshold matrix. In any case, determination of formation or non-formation of the second dots is carried out after the elimination of the required number of positions for the first dots in the order of formation of the first dots. This structure effectively prevents any overlap of the first dots with the second dots.

Similar effects may be obtained by correcting the respective threshold values of the threshold matrix. In accordance with one preferable application, the second dot formation determination means reverses the magnitude of the threshold values in the threshold matrix to give a reverse threshold matrix, and compares the recording ratio of the second dot with the reverse threshold value of the reverse threshold matrix.

This technique may be applicable unconditionally to determine formation or non-formation of the at least two different dots. Another possible structure uses the same threshold matrix until the sum of the recording ratios of the first dot and the second dot exceeds 100[%]. This structure determines whether or not the sum of the recording ratio of the first dot used for the determination by the first dot formation determination means and the recording ratio of the second dot used for the determination by the second dot formation determination means exceeds 100[%]. Only when the sum of the recording ratios of the first dot and the second dot exceeds 100[%], the recording ratio of the second dot is compared with the reverse threshold value of the reverse threshold matrix. This structure can effectively deal with the case, in which the sum of the recording ratios exceeds 100[%], while ensuring the continuity of dispersibility of both the dots.

The structure of the present invention readily gives a desired property to the distribution of at least two different dots having different characteristics as a whole. In the following description, it is assumed that the desired property is good dispersibility of dots. Determination of the on/off state of dots by the first ink is equivalent to the independent processing for one ink. Use of a dither matrix having excellent dispersibility readily gives the good dispersibility to dots by the first ink. Dots by the second ink are formed in the numerical order of the dither matrix, which follows the numerical order for turning on the dots by the first ink. This structure ensures the extremely good dispersibility of dots in total. The distribution of dots by the second ink formed in this manner may have the lower dispersibility than the result of the independent processing for the second ink. This possible disadvantage is, however, negligible compared with the effect of improving the total dispersibility of the at least two different dots and significantly enhancing the picture quality.

The techniques discussed above apply the same threshold matrix to the at least two different dots and enable the second dots to be formed in a natural order except the positions occupied by the first dots. The third or the subsequent dots may be formed in the normal sequence of the threshold values of the threshold matrix or alternatively in the reverse order of the threshold values.

In accordance with one preferable application, the at least two different dots having different characteristics may be at least two different dots having different densities per unit area. In this case, it is desirable that the head can form at least two different dots having different densities per unit area. The at least two different dots having different densities may be realized by dots having the same size but different densities or alternatively by dots having the same density but different sizes. These dots may also be formed by overlapping dots of the same density.

In printers for forming ink dots on a white sheet of paper, dots by the higher-density ink are more prominent than dots by the lower-density ink. In case that a discrete dither matrix, such as a Beyer's threshold matrix or a blue noise matrix, is used for systematic dither, it is desirable to first determine the on/off state of dots by the higher-density ink. This is because the ink that is processed first has the better dot dispersibility, as discussed previously. The more prominent deep dots are accordingly binarized first to attain the good dispersibility, whereas the less prominent light dots are processes later to ensure the good dispersibility of both the deep dots and the light dots as a whole. This results in an ideal output.

In accordance with another preferable application, the at least two different dots having different characteristics may be at least two different dots having different hues. In this case, it is desirable that the head can discharge at least two inks of different hues, for example, at least two of black, cyan, magenta, and yellow inks, to form the dots of the respective hues. The head may be divided into several parts corresponding to the respective colors or may be integrated with an ink cartridge.

Application of a discrete threshold matrix to the above structures improves the dispersibility of dots and reduces the degree of granularity of the resulting prints.

The head for forming the at least two different dots having different characteristics may have a mechanism for discharging ink particles under a pressure applied to each ink running through an ink conduit by application of a voltage to a piezoelectric element arranged in the ink conduit, or a mechanism for discharging ink particles under a pressure applied to each ink running through an ink conduit by air bubbles that are produced by a supply of electricity to a heating body arranged in the ink conduit. The head may form dots by the thermal transfer mechanism or the thermal sublimation mechanism.

Selection of one dot among the two different dots for the prior determination depends upon the purpose of image processing. The determination may be carried out first for the dot having the higher density per unit area or for the dot having the lower density per unit area.

When the at least two different dots having different characteristics are formed by at least two inks including a high-density ink and a low-density ink, the dye density of the low-density ink may be approximately one quarter the dye density of the high-density ink. The density ratio of this range improves the appearance of dots in the resulting prints, and especially ensures a smooth change from the low-density area to the high-density area.

In case that inks of different densities are used, a practical structure has a head, from which the higher-density ink and the lower-density ink are dischargeable to form dots of different densities for at least either one of cyan and magenta.

In case that the at least two different dots having different characteristics are at least two different dots having different hues, it is preferable that the determination is carried out first for the dots of the hue having the greater visual effect.

When the head can record an image by dots of at least cyan, magenta, yellow, and black inks, it is preferable that the determination is carried out first for dots by the black ink and second for dots by the yellow ink, among these color inks. Since yellow has high lightness and is visually inconspicuous, formation of yellow dots together with black dots by the dither method does not deteriorate the picture quality.

When the head can record an image by dots of at least cyan, magenta, yellow, and black inks, another possible application carries out the determination first for dots by the black ink and second for dots by either the cyan ink or the magenta ink.

In case that the determination is carried out for the black ink and either the cyan ink or the magenta ink in the above manner, a desirable structure determines formation or non-formation of dots by the yellow ink and, when formation of yellow dots is determined, specifies the positions of the yellow dots to avoid the positions occupied by the black dots. Since yellow has high lightness, formation of yellow dots on black dots does not have any visual effects.

The present invention includes a variety of other applications. A first possible application is arrangement of one or a plurality of means selected among the input means, the first dot formation determination means, and the second dot formation determination means in an output device of images to be printed, instead of in the casing of a printing system. The first dot formation determination means and the second dot formation determination means may be realized by discrete circuits or by software in an arithmetic and logic circuit including a CPU. In the latter case, the output device of images to be printed, such as a computer, carries out the processing related to formation of dots. Only a mechanism for regulating discharge of inks from the head and recording the dots on a sheet of paper may be arranged in the casing of the printing system. In accordance with another possible application, these means are divided into two groups, and one group is realized in the casing of the printing system, whereas the other group is realized in the output device of images to be printed.

A second possible application is a program supply system for supplying a program for realizing the image processing of the present invention on the computer via a communications line.

A third possible application is a print prepared by the image recording method discussed above. An image is recorded on the print by the image recording method for recording a multi-tone image by a distribution of at least two different dots having different characteristics in a printing system with a head, from which inks are dischargeable to record the at least two different dots having different characteristics on an object. The print is obtained by: successively receiving a tone signal of each pixel included in an image to be printed; specifying recording ratios of the at least two different dots having different characteristics with respect to each pixel, based on the input tone signal; comparing the recording ratio specified for a first dot among the at least two different dots having different characteristics with a threshold value corresponding to each pixel and read from a threshold matrix, which corresponds to a dither pattern provided in advance, in order to determine whether or not the first dot is to be formed at a position corresponding to each pixel; comparing the recording ratio specified for a second dot among the at least two different dots having different characteristics with the threshold value of the threshold matrix, in order to determine whether or not the second dot is to be formed at a position corresponding to each pixel, except positions corresponding to the pixels where formation of the first dot has been determined; and driving the head to form the at least two different dots having different characteristics, based on the results of determination.

Sequential analysis of the recording state of dots on such a print from the low density area to the high density area shows that one dither matrix is used to form a plurality of different dots in a non-overlapping manner while maintaining the continuity of dispersibility of the dots. Still another application of the present invention is a print prepared by the printing system of the present invention discussed above.

These and other objects, features, aspects, and advantages of the present invention will become more apparent from the following detailed description of the preferred embodiments with the accompanying drawings.

BRIEF DESCRIPTION OF THE DRAWINGS

FIG. 6 is a perspective view showing a color ink cartridge 70a;

FIG. 10 shows compositions of color inks used in the first embodiment;

FIG. 16a through FIG. 16g show formation of deep dots and light dots in the first embodiment;

FIG. 17a through FIG. 17g show formation of dots having different diameters as a second embodiment according to the present invention;

DESCRIPTION OF THE PREFERRED EMBODIMENTS

Figure 1:
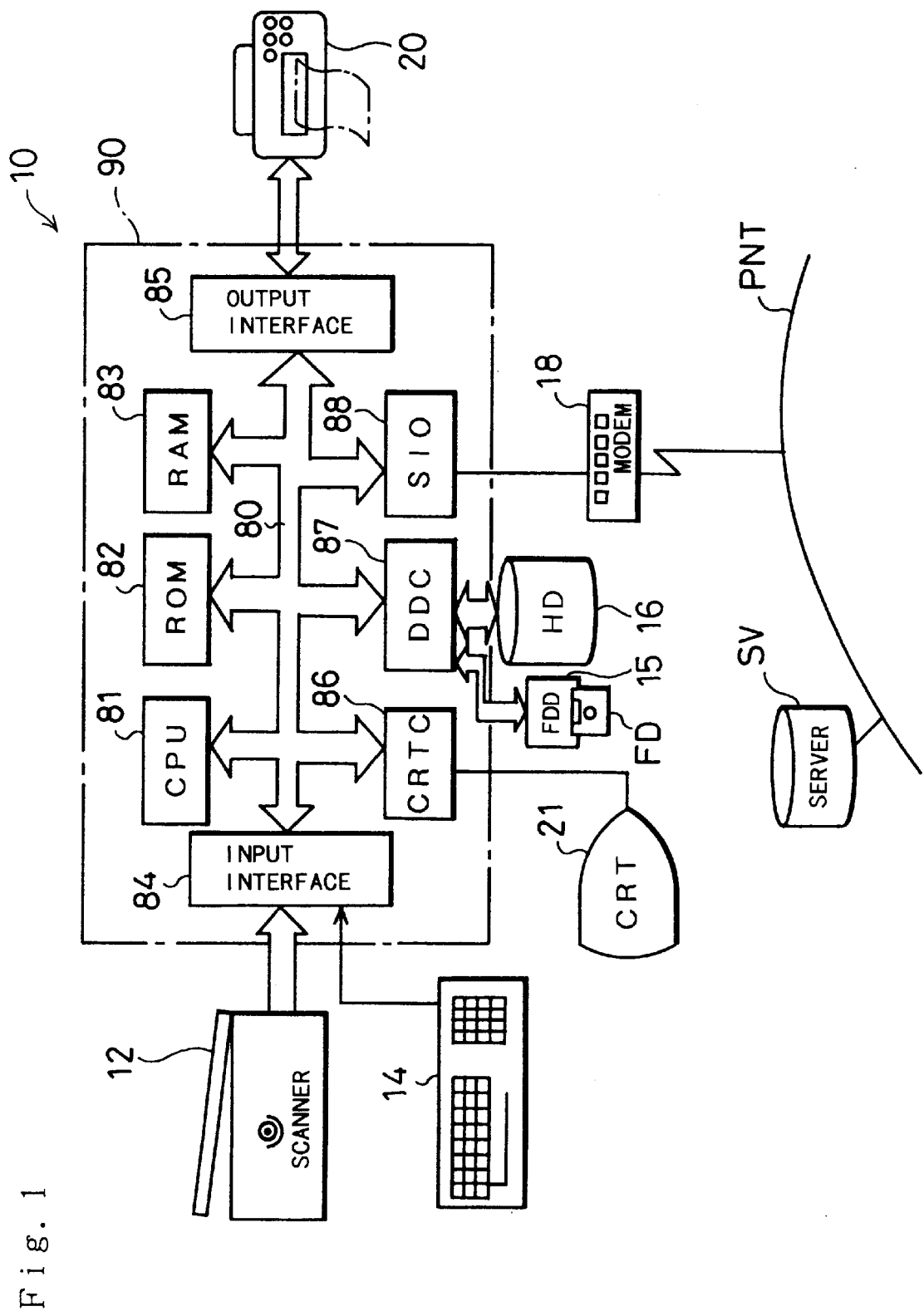
FIG. 1 is a block diagram schematically illustrating structure of a printing system as a first embodiment according to the present invention.

Some modes of carrying out the present invention are described below as preferred embodiments. FIG. 1 is a block diagram illustrating structure of a printing system as a first embodiment according to the present invention. The printing system includes a computer 90 connected to a printer 20 and a scanner 12. The computer 90 executes predetermined programs loaded therein, so as to realize the printing system of the embodiment. The hardware of the printing system is the conventional computer 90. The computer 90 includes a CPU 81 for executing a variety of arithmetic and logic operations according to programs in order to control the actions related to image processing, and other peripheral units mutually connected to one another via a bus 80. A ROM 82 stores programs and data required for execution of the variety of arithmetic and logic operations by the CPU 81. A RAM 83 is a memory, which various programs and data required for execution of the variety of arithmetic and logic operations by the CPU 81 are temporarily read from and written in. An input interface 84 receives input signals from the scanner 12 and a keyboard 14, whereas an output interface 85 sends output data to the printer 20. A CRTC 86 controls signal outputs to a CRT 21 that can display color images. A disk controller (DDC) 87 controls transmission of data from and to a hard disk 16, a flexible drive 15, and a CD-ROM drive (not shown). The hard disk 16 stores a variety of programs that are loaded into the RAM 83 and executed, as well as other programs that are supplied in the form of a device driver. A serial input-output interface (SIO) 88 is also connected to the bus 80. The SIO 88 is connected to a public telephone network PNT via a modem 18. The computer 90 is connected with an external network via the SIO 88 and the modem 18, and can access a specific server SV in order to download the programs required for image processing into the hard disk 16. The computer 90 may alternatively execute the required programs loaded from a flexible disk FD or a CD-ROM.

Figure 2:
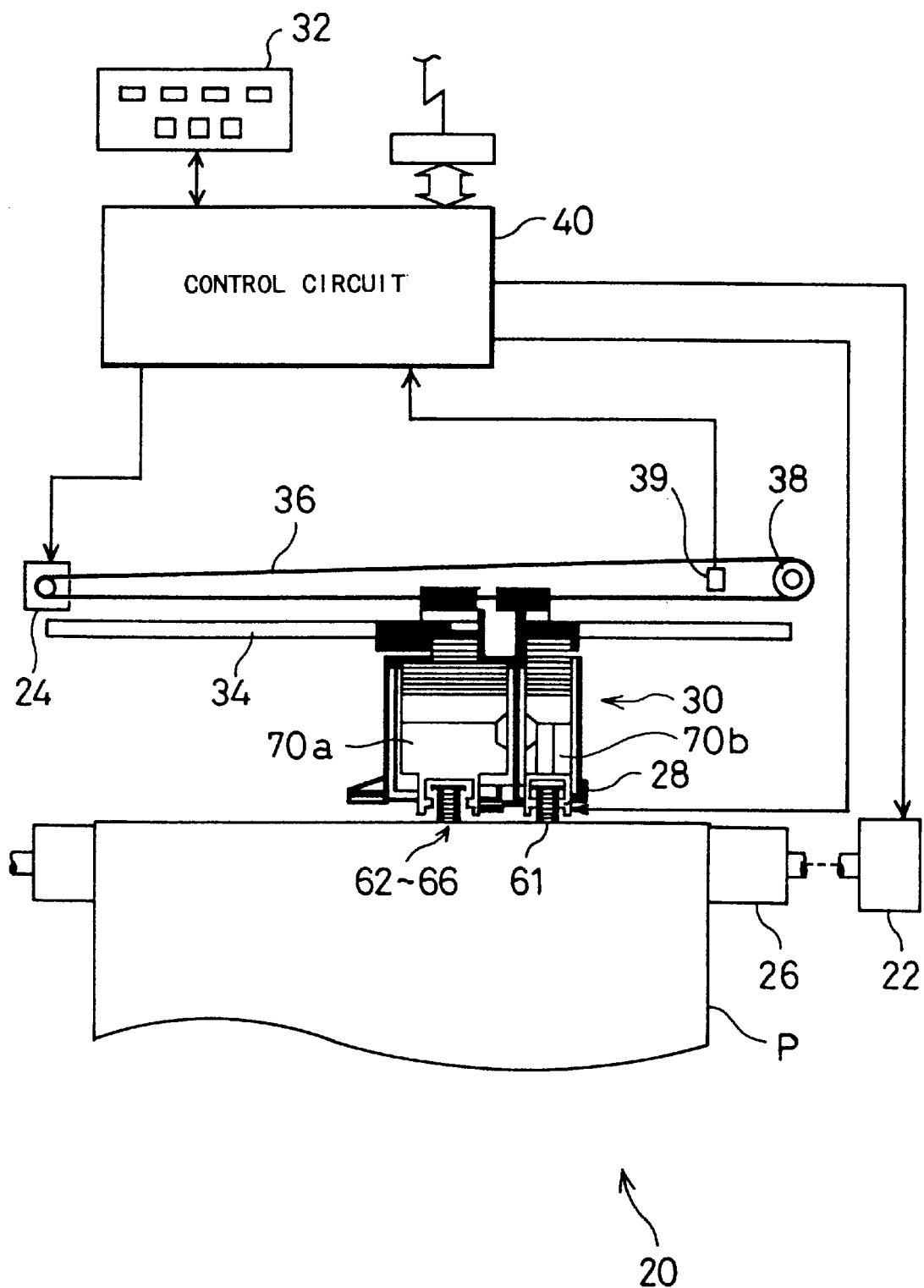
FIG. 2 schematically illustrates structure of a printer 20 used in the first embodiment.

Referring to FIG. 2, the printer 20 has a mechanism for feeding a sheet of paper P by means of a sheet feed motor 22, a mechanism for reciprocating a carriage 30 along the axis of a platen 26 by means of a carriage motor 24, a mechanism for driving a print head 28 mounted on the carriage 30 to control discharge of ink and production of dot patterns, and a control circuit 40 for transmitting signals to and from the sheet feed motor 22, the carriage motor 24, the print head 28, and a control panel 32.

The mechanism for feeding the sheet of paper P has a gear train (not shown) for transmitting rotations of the sheet feed motor 22 to the platen 26 as well as a sheet feed roller (not shown). The mechanism for reciprocating the carriage 30 includes a sliding shaft 34 arranged in parallel with the axis of the platen 26 for slidably supporting the carriage 30, a pulley 38, an endless drive belt 36 spanned between the carriage motor 24 and the pulley 38, and a position sensor 39 for detecting the position of the origin of the carriage 30.

Figure 3:
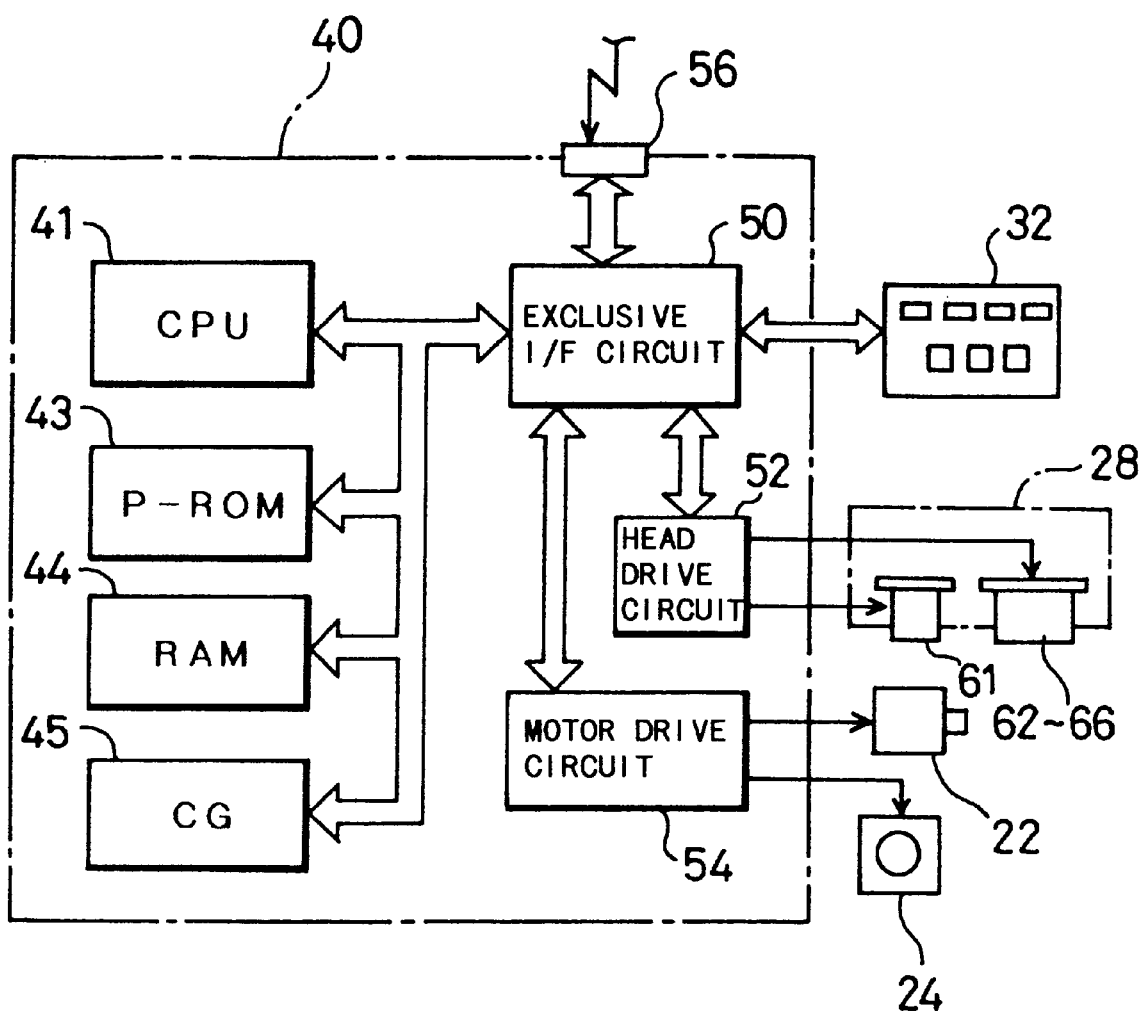
FIG. 3 is a block diagram showing structure of a control circuit 40 included in the printer 20.

Structure of the control circuit 40 and peripheral units included in the printer 20 is discussed below with the block diagram of FIG. 3. Referring to FIG. 3, the control circuit 40 is constructed as a known arithmetic and logic operation circuit including a CPU 41, a P-ROM 43 for storing programs, a RAM 44, and a character generator (CG) 45 for storing dot matrices of characters. The control circuit 40 further includes an exclusive I/F circuit 50 exclusively working as an interface to an external motor and the like, a head drive circuit 52 connected with the exclusive I/F circuit 50 for driving the print head 28, and a motor drive circuit 54 connected with the exclusive I/F circuit 50 for driving the sheet feed motor 22 and the carriage motor 24. The exclusive I/F circuit 50 includes a parallel interface circuit and is connected to a computer via a connector 56 to receive printing signals output from the computer. Output of image signals from the computer will be discussed later.

Figure 4:
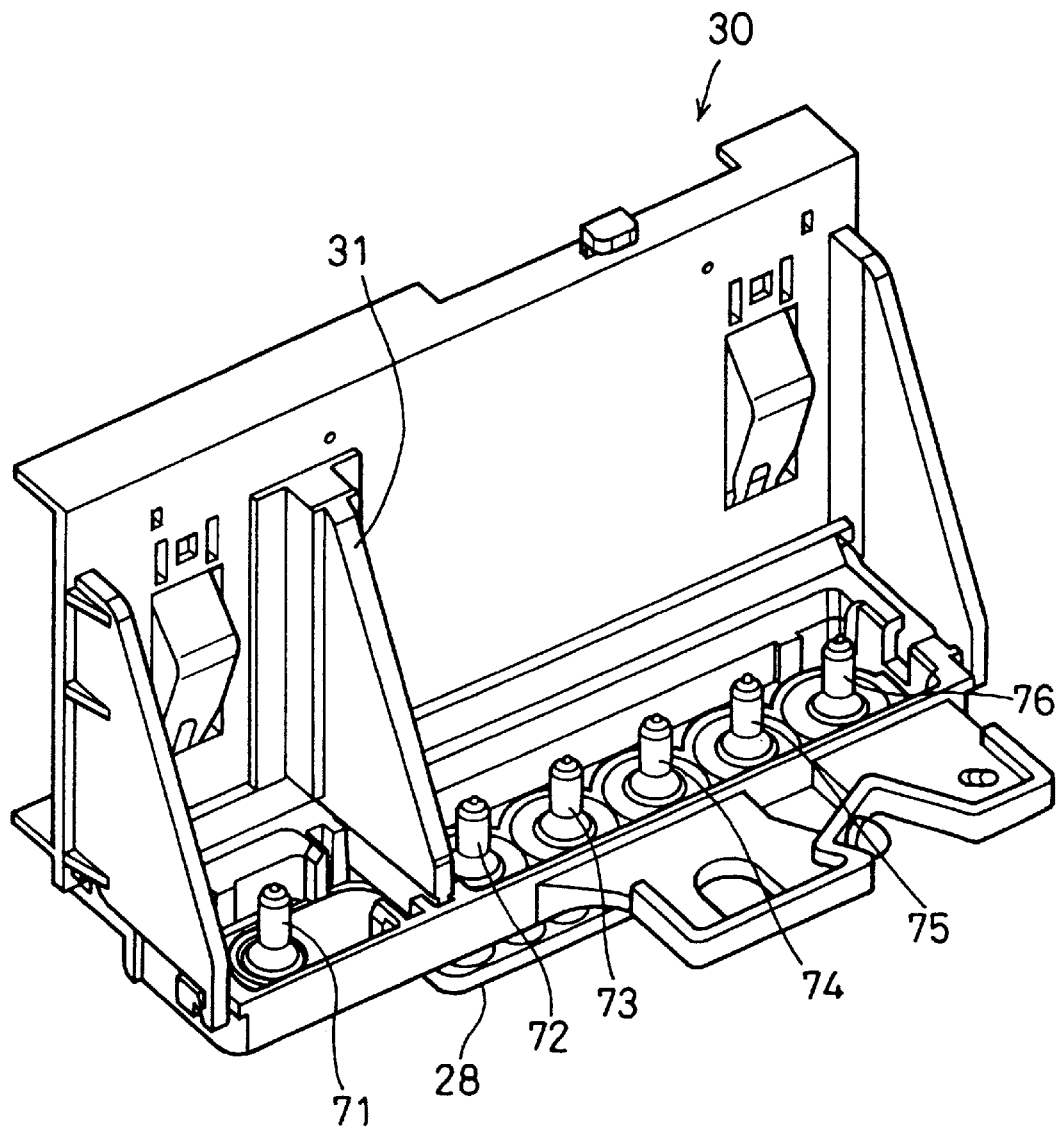
FIG. 4 is a perspective view illustrating structure of a carriage 30 included in the printer 20.
Figure 5:
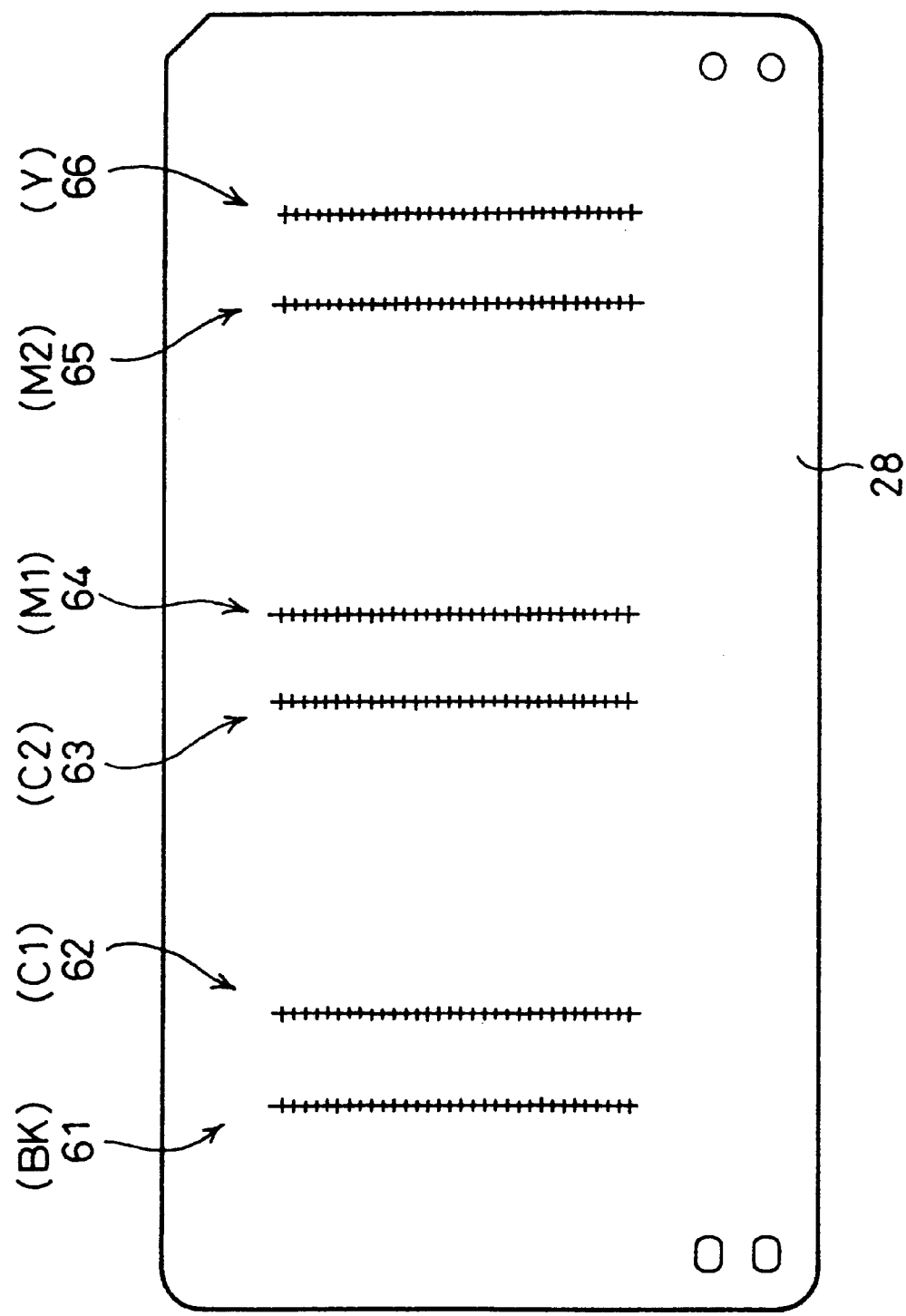
FIG. 5 shows an arrangement of color heads 61 through 66 in a print head 28.
Figure 6:
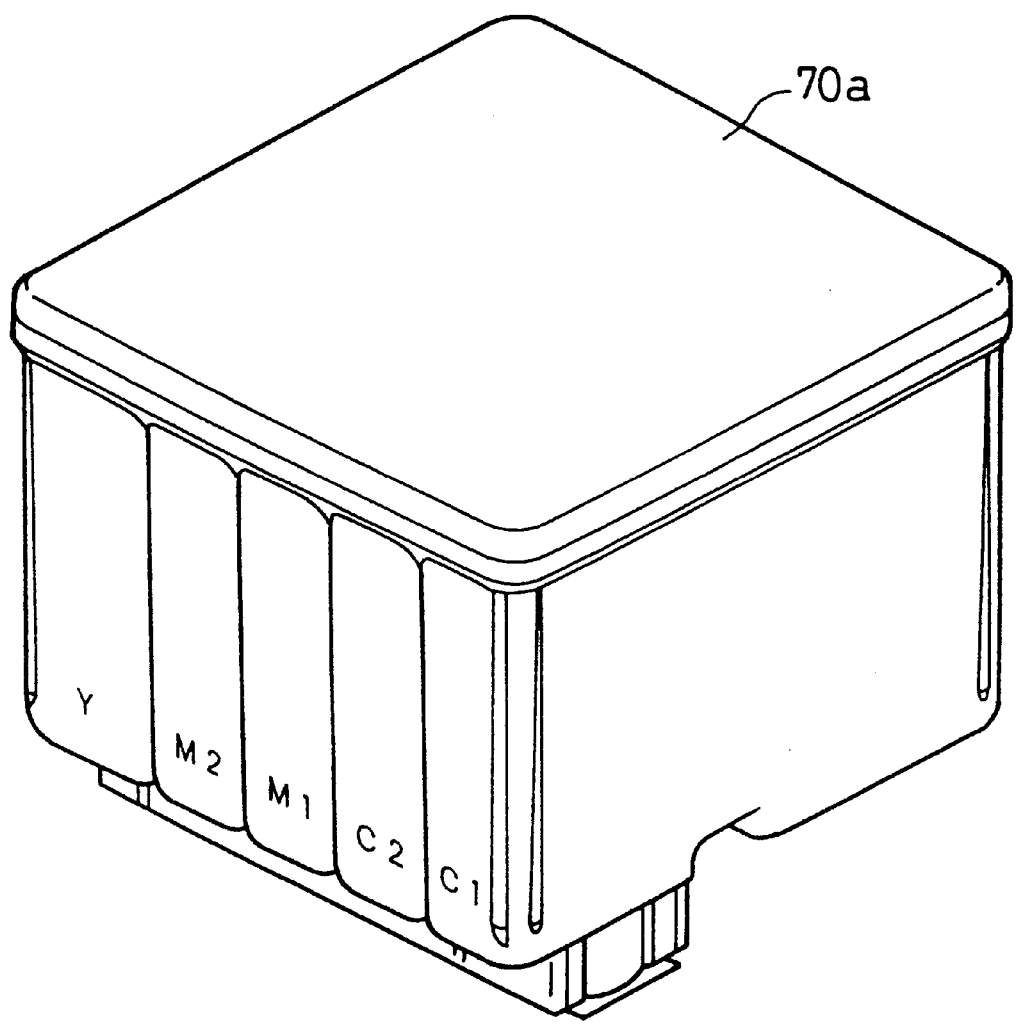

The following describes a concrete structure of the carriage 30 and the principle of discharging ink by the print head 28 mounted on the carriage 30. A color ink cartridge 70*a* and a black ink cartridge 70*b* (see FIG. 2) are attachable to the substantially L-shaped carriage 30 shown in FIG. 4. Detailed structure of the color ink cartridge 70*a* is shown in FIG. 6. A partition wall 31 separates the black ink cartridge 70*b* from the color ink cartridge 70*a*. Referring to FIG. 5, six color heads 61 through 66 for respectively discharging color inks are formed in the print head 28 that is disposed on the lower portion of the carriage 30. Ink supply pipes 71 through 76 for leading inks from ink tanks to the respective color heads 61 through 66 are formed upright on the bottom of the carriage 30 as shown in FIG. 4. When the color ink cartridge 70*a* and the black ink cartridge 70*b* are attached downward to the carriage 30, the ink supply pipes 71 through 76 are inserted into connection holes formed in the respective cartridges 70*a* and 70*b*.

Figure 7:
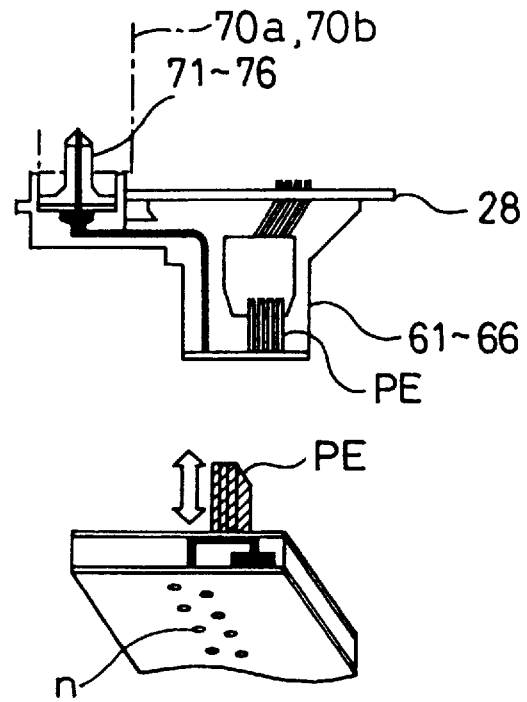
FIG. 7 shows a mechanism of ink discharge in each of the color heads 61 through 66.

When the ink cartridge 70 (including the color ink cartridge 70*a* and the black ink cartridge 70*b*) is attached to the carriage 30, inks in the ink cartridge 70 are sucked out by capillarity through the ink supply pipes 71 through 76 and are led to the color heads 61 through 66 formed in the print head 28 arranged on the lower portion of the carriage 30 as shown in FIG. 7. At the time of initial attachment of the ink cartridge 70, the respective inks are sucked into the corresponding color heads 61 through 66 by means of a pump, although the pump and the other related elements are omitted from the illustration.

Figure 8A:
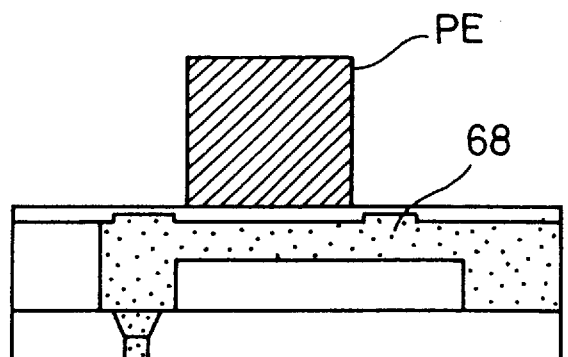
FIGS. 8A and 8B show a process of discharging ink particles Ip by extension of a piezoelectric element PE.
Figure 8B:
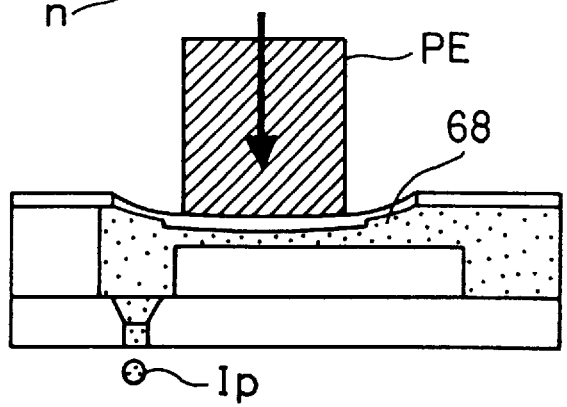

A row of nozzles 'n' are formed in each of the color heads 61 through 66 as shown in FIGS. 5 and 7. In this embodiment, the number of nozzles for each color head is 32. A piezoelectric element PE is arranged for each row of nozzles 'n'. As is known, the piezoelectric element PE has a crystal structure undergoing mechanical stress by application of a voltage and thereby carries out extremely high-speed conversion of electrical energy to mechanical energy. FIGS. 8A and 8B illustrate configuration of the piezoelectric element PE and the nozzles 'n'. The piezoelectric element PE is disposed at a position that comes into contact with an ink conduit 68 for leading ink to the nozzles 'n'. In this embodiment, application of a voltage between electrodes on either ends of the piezoelectric element PE for a predetermined time period causes the piezoelectric element PE to abruptly extend and deform one side wall of the ink conduit 68 as shown in FIG. 8B. The volume of the ink conduit 68 is reduced with an extension of the piezoelectric element PE, and a certain amount of ink corresponding to the volume reduction is discharged as ink particles Ip from the ends of the nozzles 'n' with a high speed. The ink particles Ip soak into the sheet of paper P set on the platen 26, so as to print images.

In order to ensure spaces for the piezoelectric elements PE, the six color heads 61 through 66 are divided into three pairs on the print head 28 as shown in FIG. 5. The first pair includes the black ink head 61 that is arranged at one end close to the black ink cartridge 70*b* and the cyan ink head 62 that is disposed next to the black ink head 61. The second pair includes the head 63 for lower-density cyan ink compared with the standard cyan ink supplied to the cyan ink head 62 (hereinafter referred to as light cyan ink) and the magenta ink head 64. The third pair includes the head 65 for lower-density magenta ink compared with the standard magenta ink supplied to the magenta ink head 64 (hereinafter referred to as light magenta ink) and the yellow ink head 66. The compositions and densities of the respective inks will be discussed later.

Figure 9:
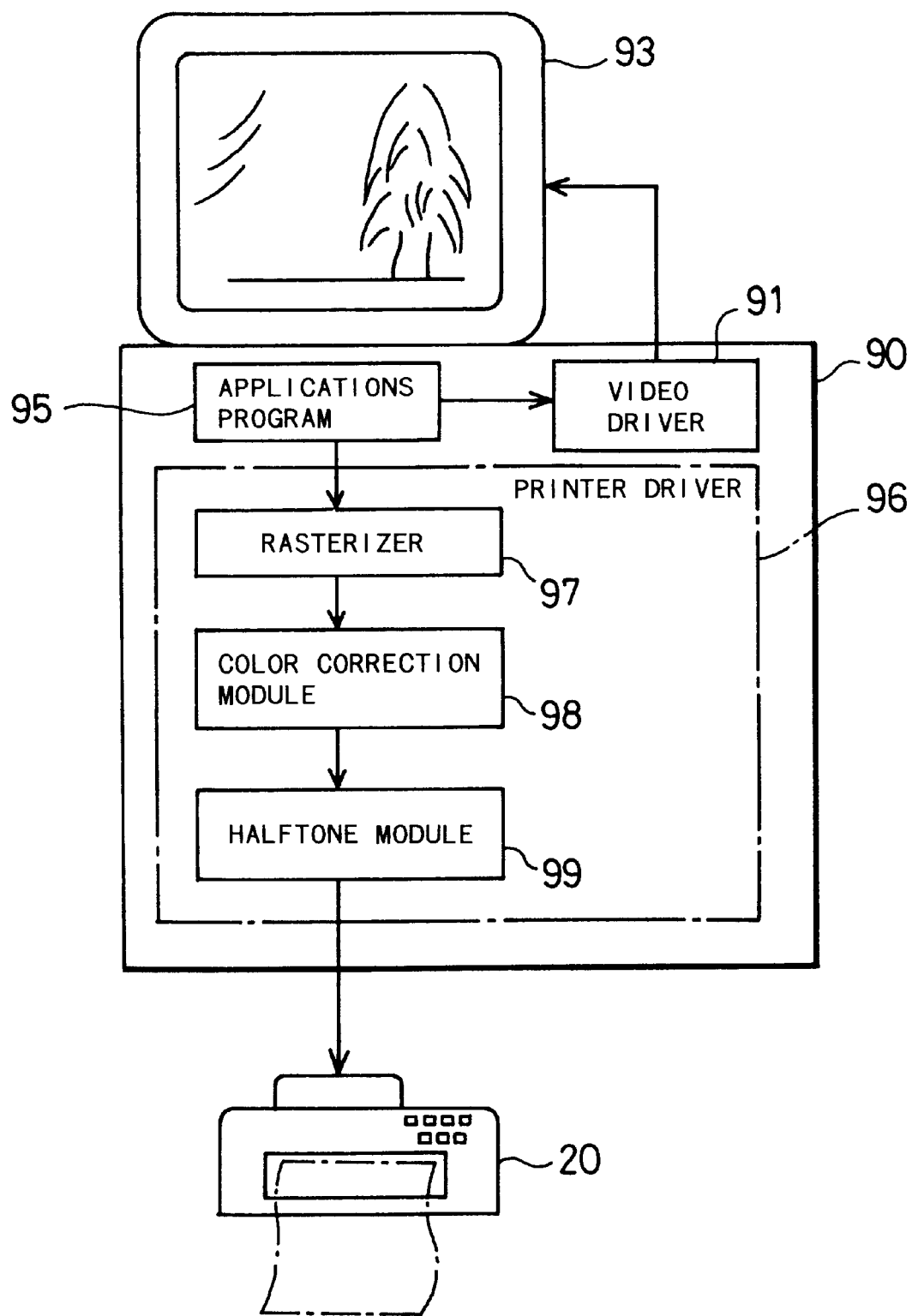
FIG. 9 is a block diagram showing a series of processes that enable a computer 90 to print images based on image information.

In the printer 20 of the embodiment having the hardware structure discussed above, while the sheet feed motor 22 rotates the platen 26 and the other rollers to feed the sheet of paper P, the carriage 30 is driven and reciprocated by the carriage motor 24 and the piezoelectric elements PE on the respective color heads 61 through 66 of the print head 28 are driven simultaneously. The printer 20 accordingly discharges the respective color inks and transfers multi-color images onto the sheet of paper P. Referring to FIG. 9, the printer 20 prints multi-color images based on signals output from an image production apparatus, such as the computer 90, via the connector 56. In this embodiment, an applications program 95 working in the computer 90 processes images and displays the processed images on a CRT display 93 via a video driver 91. When the applications program 95 outputs a printing instruction, a printer driver 96 in the computer 90 receives image information from the applications program 95 and the printer 20 converts the image information to printable signals. In the example of FIG. 9, the printer driver 96 includes a rasterizer 97 for converting the image information processed by the applications program 95 to dot-based color information, a color correction module 98 for making the image information that has been converted to the dot-based color information (tone data) undergo color correction according to the colorimetric characteristics of an image output apparatus, such as the printer 20, and a halftone module 99 for generating halftone image information, which expresses densities in a specified area by the existence or non-existence of ink in each dot unit, from the color-corrected image information. Operations of these modules are known to the skilled in the art and are thus not specifically described here in principle. The contents of the halftone module 99 are, however, described when necessary.

As discussed above, the printer 20 of the embodiment has the additional heads 63 and 65 for light cyan ink and light magenta ink other than the four heads 61, 62, 64, and 66 for the standard four color inks K, C, M, and Y in the print head 28. As shown in FIG. 10, light cyan ink and light magenta ink have lower dye densities than those of standard cyan ink and magenta ink. Cyan ink of standard density (defined as C1 in FIG. 10) includes 3.6% by weight of Direct blue 99 as a dye, 30% by weight of diethylene glycol, 1% by weight of Surfinol 465, and 65.4% by weight of water. Light cyan ink (defined as C2 in FIG. 10), on the other hand, includes only 0.9% by weight of Direct blue 99, that is, one quarter the dye density of the cyan ink C1, and 35% by weight of diethylene glycol and 63.1% by weight of water for adjustment of the viscosity. Magenta ink of standard density (defined as M1 in FIG. 10) includes 2.8% by weight of Acid red 289 as a dye, 20% by weight of diethylene glycol, 1% by weight of Surfinol 465, and 79% by weight of water. Light magenta ink (defined as M2 in FIG. 10), on the other hand, includes only 0.7% by weight of Acid red 289, that is, one quarter the dye density of the magenta ink M1, and 25% by weight of diethylene glycol and 74% by weight of water for adjustment of the viscosity.

Yellow ink Y includes 1.8% by weight of Direct Yellow 86 as a dye, whereas black ink K includes 4.8% by weight of Food black 2 as a dye. All these inks are adjusted to have the viscosity of approximately 3 [mPa.s]. Adjustment of the viscosity to the substantially identical level enables identical control of the piezoelectric elements PE for the respective color heads 61 through 66.

Figure 11:
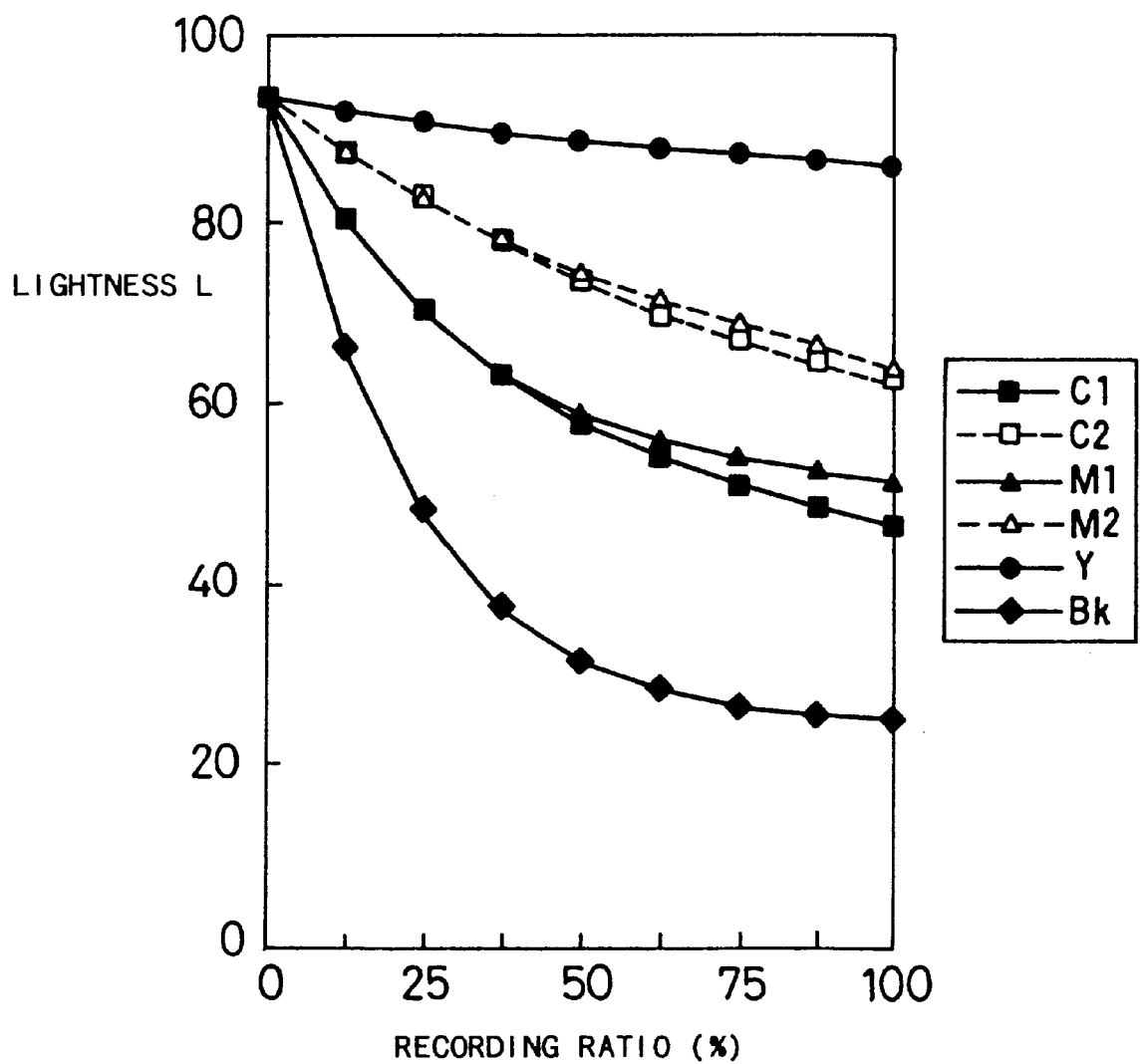
FIG. 11 is a graph showing the lightness plotted against the recording ratio of each color ink.

FIG. 11 is a graph showing the lightness of these color inks. The abscissa of FIG. 11 denotes the recording ratio to the recording resolution of the printer, that is, the proportion of printing dots formed by the ink particles Ip discharged from the nozzles 'n' to the white sheet of paper P. The recording ratio=100 represents the state, in which the whole surface of the sheet of paper P is covered with the ink particles Ip. In this embodiment, the light cyan ink C2 has approximately one quarter the dye density (percent by weight) of the cyan ink C1. The lightness of the light cyan ink C2 at the recording ratio of 100% is equal to the lightness of the cyan ink C1 at the recording ratio of approximately 35%. This relationship is also applicable to the lightness of the magenta ink M1 and the light magenta ink M2. The proportion of recording ratios of different-density inks giving the identical lightness is defined by the beauty of color mixture in case that the two different-density inks are mixed in print. In practice, it is desirable to adjust the proportion in the range of 20% to 50%. This relationship is substantially equivalent to the adjustment of the dye density (percent by weight) of the lower-density ink (light cyan ink C2 or the light magenta ink M2) to almost one fifth to one third the dye density (percent by weight) of the higher-density ink (cyan ink C1 or the magenta ink M1).

Figure 12:
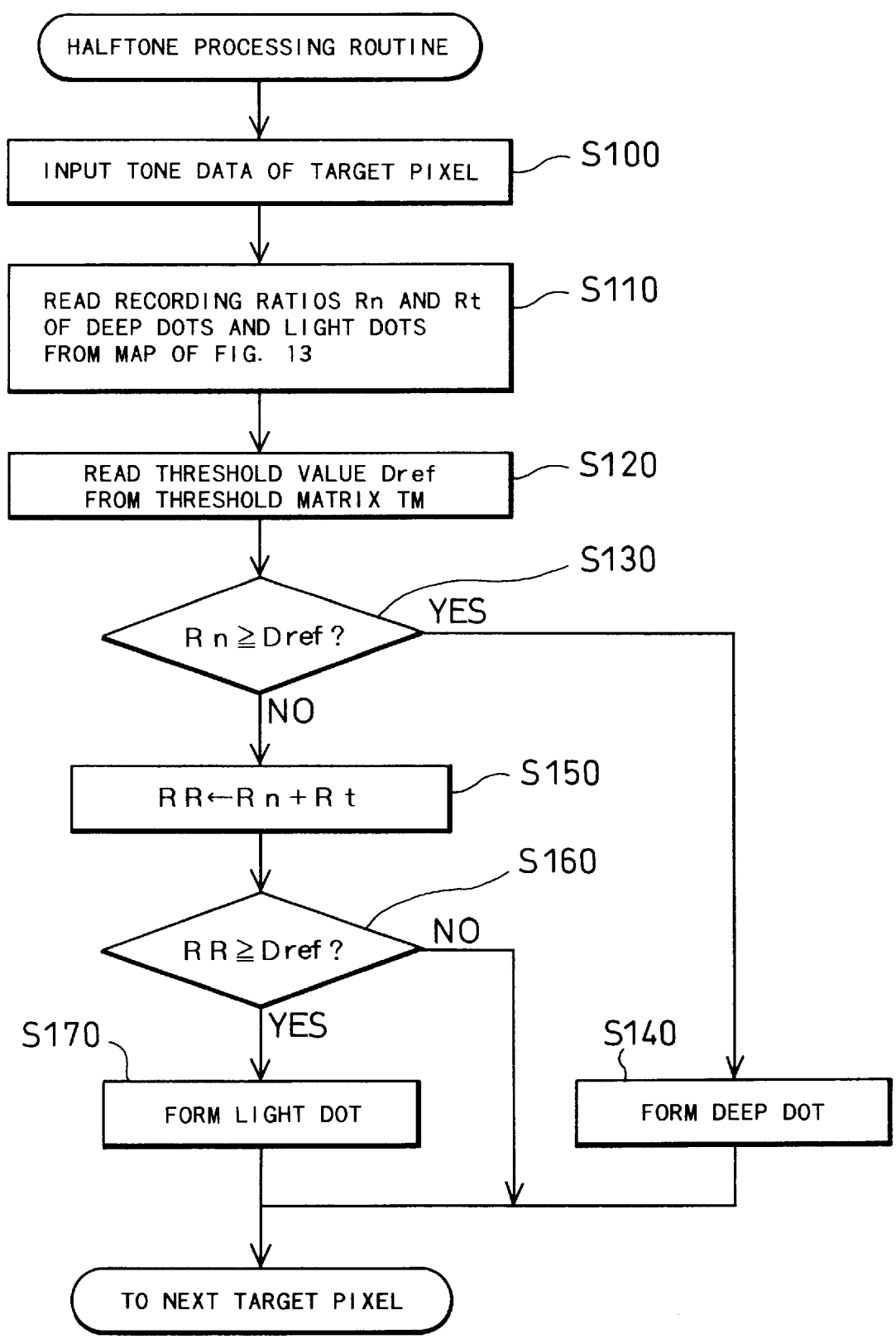
FIG. 12 is a flowchart showing a halftone processing routine carried out by the halftone module 99 in the first embodiment.

The printer 20 of the embodiment carries out the processing in the halftone module 99 of the printer driver 96 and thereby prints images with high-density ink and low-density ink. FIG. 12 is a flowchart showing a dither-based halftone processing routine carried out in the halftone module 99. When a printing process starts, pixels are successively scanned from the upper left corner of one image set as the origin. The halftone module 99 receives color-corrected tone data DS (8 bits respectively for C, M, Y, and K) of a target pixel in the order along the scanning direction of the carriage 30 from the color correction module 98 at step S100.

The following description is on the assumption that images are printed only in cyan ink. In the actual state, however, images are printed in multiple colors; deep dots and light dots of magenta are formed by the higher-density magenta ink M1 and the lower-density light magenta ink M2, whereas dots of yellow and dots of black are respectively formed by the yellow ink Y and the black ink K. In case that dots are formed by different color inks in a predetermined area, required control is carried out to realize the favorable color reproduction by color mixture. By way of example, one control procedure (not specifically described here) does not allow dots of different colors to be printed at the same position.

Figure 13:
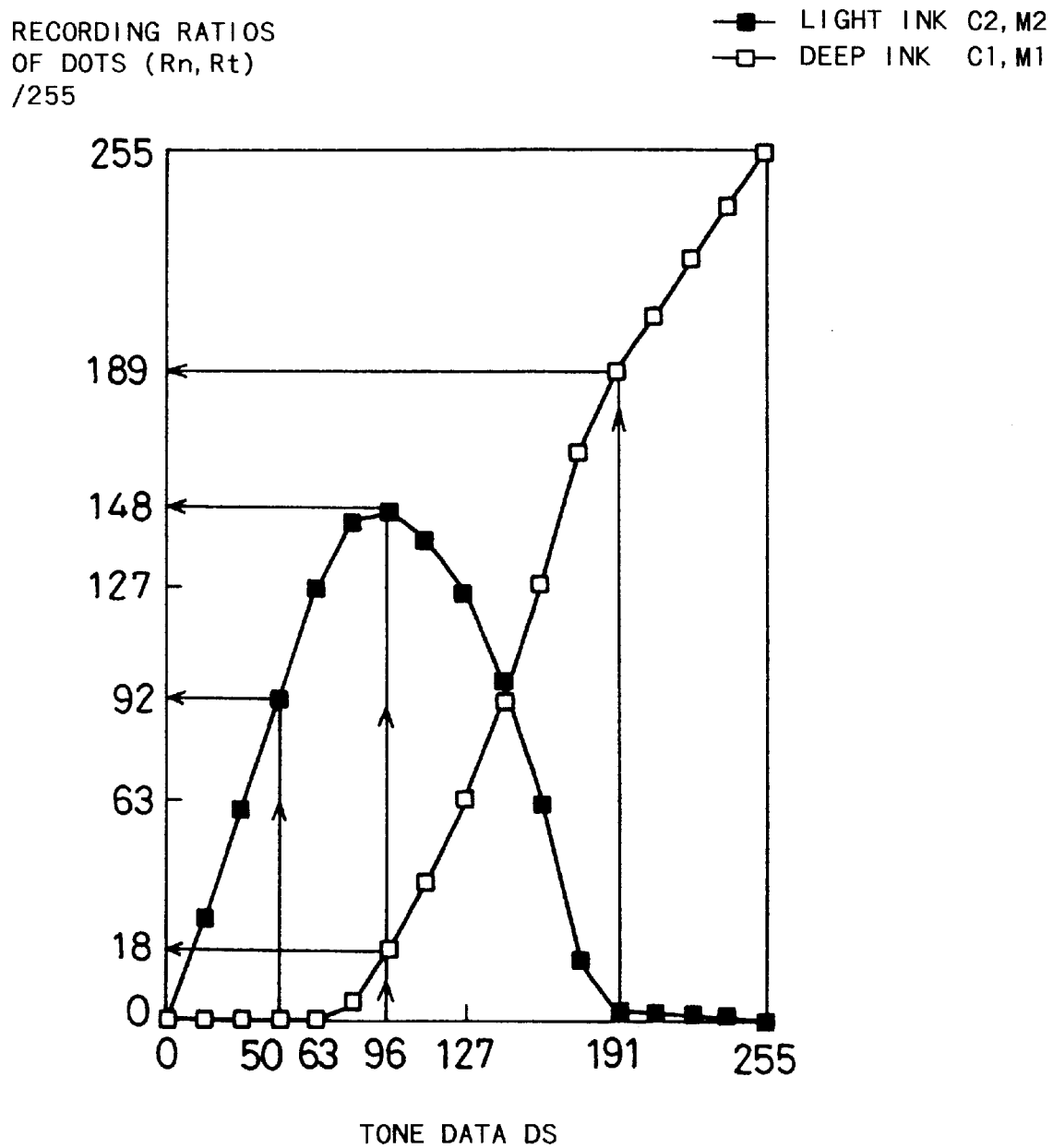
FIG. 13 is a graph showing the relationship between the recording ratios of light dots and deep dots and the tone data used in the first embodiment.

The program then reads recording ratios Rn and Rt of deep dots and light dots corresponding to the input tone data DS from the map of FIG. 13 at step S110. The map of FIG. 13 shows the recording ratios of deep dots and light dots plotted against the tone data of the original image. By way of example, when the input tone data DS is 96/255, the recording ratio Rt of light dots and the recording ratio Rn of deep dots are determined as 148/255 and 18/255, respectively. Although the recording ratio is shown by percentage in the graph of FIG. 11, the recording ratio is expressed by the absolute value in the graph of FIG. 13, in order to allow required data to be directly read from the map in the halftone processing routine. The absolute value '255' corresponds to 100%.

Figures 14A, 14B, 14C:
FIG. 14A through FIG. 14C show a process of formation of deep dots and light dots based on the systematic dither method.

At subsequent step S120, the halftone module 99 refers to a threshold matrix TM for the dither-based halftone processing. Namely a threshold value Dref used for determining the on/off state of deep dots is read from the threshold matrix TM. The threshold value Dref is a reference value for determining whether or not a dot of deep ink should be formed in a target pixel and may be fixed to one value, for example, 127. In this embodiment, however, systematic dither method using a threshold matrix of discrete dither is applied to set the threshold value Dref. The threshold matrix of discrete dither used here is, for example, a wide-range matrix of 64×64 in size (blue noise matrix). Different threshold values Dref used for determining the on/off state of deep dots are accordingly set for the respective target pixels. FIG. 14(A) shows the principle of the systematic dither method. Although the matrix shown in FIG. 14 has the size of 4×4 as a matter of convenience of illustration, the matrix actually used has the size of 64×64.

Figure 15:
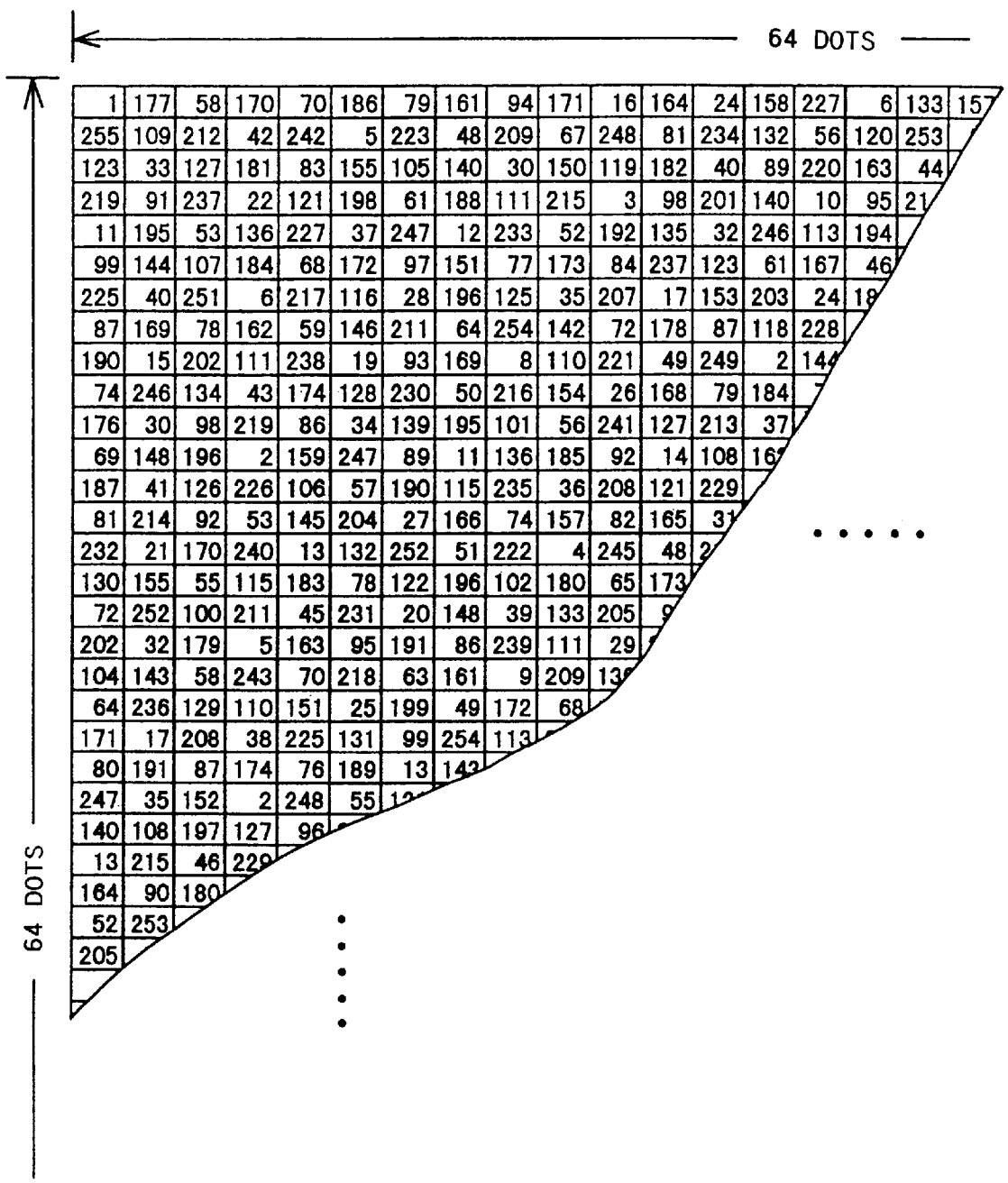
FIG. 15 shows part of a 64×64 wide-range matrix.

FIG. 15 shows part of the wide-range matrix of 64×64 in size (blue noise matrix) used in this embodiment. Threshold values (0 to 255) are specified to have no bias in appearance of threshold values in any 16×16 areas included in the 64×64 matrix. The method of specifying the threshold values includes the steps below:

(1) The numerals of 1 to 4096 are arranged at random in 64×64=4096 boxes;

(2) The numerals in the respective boxes are divided by 4096/255=16.06; and (3) The value '1' is added to each quotient, and all the figures below the decimal are omitted.

This process results in an arrangement of the numerals of 1 to 255 in the respective boxes. The frequency of appearance of the respective numerals, 1 to 255, is sixteen times or seventeen times. The wide-range matrix effectively prevents occurrence of pseudo-contours. The discrete dither ensures high spatial frequencies of dots determined by the threshold matrix and makes dots sufficiently scattered in the specified area. A concrete example of the discrete dither is a Beyer's threshold matrix. Application of the discrete dither causes deep dots to be sufficiently scattered and realizes a non-biased distribution of deep dots and light dots, thereby improving the picture quality.

After referring to the threshold matrix TM and reading the threshold value Dref of the target pixel at step S120, the program compares the recording ratio Rn of deep dots with the threshold value Dref with respect to the target pixel at step S130. In case that the recording ratio Rn of deep dots is not smaller than the threshold value Dref, the program goes to step S140 to form a dot by the deep ink at the position corresponding to the target pixel. This concludes the halftone processing for one target pixel.

In case that the recording ratio Rn of deep dots is smaller than the threshold value Dref, on the contrary, the program goes to step S150 to correct the recording ratio Rt of light dots and give a corrected recording ratio RR, with a view to determining the on/off state of light dots. In this embodiment, the recording ratio Rt of light dots is corrected by adding the recording ratio Rn of deep dots to the recording ratio Rt of light dots. This process is shown in FIG. 14(B). Alternatively the recording ratio Rt of light dots may be corrected by subtracting the recording ratio Rn of deep dots from the corresponding threshold value Dref.

The corrected recording ratio RR of light dots is then compared with the threshold value Dref used for determining the on/off state of deep dots at step S160. In this embodiment, since the recording ratio Rt of light dots is corrected, the threshold value Dref read at step S120 is not required changing but is used without any correction. In case that the corrected recording ratio RR of light dots is not smaller than the threshold value Dref, the program proceeds to step S170 to form a dot by the light ink at the position corresponding to the target pixel. This concludes the halftone processing for one target pixel. In case that the recording ratio RR is smaller than the threshold value Dref, on the other hand, the processing for the target pixel is concluded without formation of any dots. After conclusion of the processing for one target pixel, the program goes to a next target pixel and repeats the processing of steps S100 through S170 for the next target pixel. FIG. 14(C) shows a result of the halftone processing, wherein deep dots and light dots do not overlap each other. The same threshold matrix is used for determining the on/off state of both the deep dots and the light dots. The determination of the on/off state of light dots is based on the corrected recording ratio RR of light dots, which is obtained by adding the recording ratio Rn of deep dots to the recording ratio Rt of light dots. It is considered that the threshold matrix specifies the sequence of turning the dots on in response to an increase in tone, when the tone of a predetermined range corresponding to the threshold matrix is gradually increased. The concrete procedure of this embodiment accordingly turns the deep dots on in the sequence specified by the threshold matrix and then turns the light dots on in the same sequence except the positions at which the deep dots have already been turned on. This procedure ensures not only the good dispersibility of deep dots but the good dispersibility in combination of both the deep dots and the light dots. Deep dots are naturally more prominent than light dots, so that the process of the embodiment gives the priority to the dispersibility of deep dots and determines the on/off state of light dots in order to attain the good dispersibility in combination of both the deep dots and the light dots.

FIG. 16a through FIG. 16g schematically illustrate the state of printing light dots and deep dots by the cyan ink C1 and the light cyan ink C2. Although the wide-range (64×64) dither method is applied for the actual processing, the 4×4 dither pattern is shown in the example of FIG. 16a for the convenience of description. FIG. 16a shows a threshold matrix used for the 4×4 dither pattern. In the range of low tone data DS (in the range of tone data=0/255 to 63/255 in this example), dots are formed only by the light cyan ink C2 as shown in FIGS. 16b and 16c. The proportion of light dots existing in a predetermined area increases in the sequence of the threshold values Dref in the threshold matrix TM with an increase in tone data DS.

In the range of tone data DS exceeding a predetermined value (in the range of not lower than 64/255 in this example), deep dots start formation and gradually increase in number while the proportion of light dots still increases as shown in FIG. 16d. In the range of higher tone data DS (in the range of not lower than 95/255 in this example), the proportion of deep dots increases while the proportion of light dots decreases as shown in FIGS. 16(e).

In the range of still higher tone data DS (in the range of not lower than 191/255 in this example), no light dots but only deep dots are formed as shown in FIG. 16f. When the tone data reaches the maximum, the recording ratio of deep dots is equal to 255/255 (that is, 100%) as shown in FIG. 16g. In this case, the whole surface of the sheet of paper P is covered with the dots of high-density ink (cyan ink C1).

The structure of the first embodiment discussed above determines whether or not deep dots are to be formed by the higher-density ink by the dither method, based on the recording ratio Rn of deep dots, and then determines whether or not light dots are to be formed by the lower-density ink by the same dither method. The recording ratio Rt of light dots is incremented by the recording ratio Rn of the deep dots, before being compared with the threshold value Dref read from the threshold matrix TM. This method using the identical dither pattern for both the deep dots and light dots accordingly prevents deep dots and light dots from overlapping each other. The dither method realizes the higher-speed halftone processing, compared with the other conventional techniques, such as error diffusion. The structure of the first embodiment uses the identical threshold matrix TM for determining the on/off state of both the deep dots and the light dots. This reduces the required capacity for storing the threshold matrix and decreases the number of referring to the threshold matrix TM, thereby realizing the high-speed halftone processing.

As discussed previously, in this embodiment, the recording ratios of deep dots and light dots are read from the map, for example, one shown in FIG. 13. This structure enables a natural distribution of deep dots and light dots having the excellent tone expression to be readily specified by adequately setting the relationship between the tone data DS and the recording ratios Rn and Rt of deep dots and light dots.

In this embodiment, specification of the recording ratios of the light cyan ink C2 and the cyan ink C1 based on the map of FIG. 13 gives the following characteristics:

(1) Only the light cyan ink C2 is recorded in the range of low tone data DS (the range of 0/255 to 63/255 in this example) In this range, the recording ratio Rt of the light cyan ink C2 monotonously increases with an increase in magnitude of tone data DS.

(2) Before the recording ratio Rt of the light cyan ink C2, which increases with an increase in input tone data DS, reaches its maximum (148/255 in this example), formation of dots by the higher-density cyan ink C1 starts and the recording ratio Rn of the cyan ink C1 gradually increases with an increase in tone data DS. In this example, formation of dots by the cyan ink C1 starts when the value of input tone data DS exceeds 63/255. The specific value of tone data DS giving the maximum recording ratio of dots by the light cyan ink C2 is 96/255 in this example.

(3) When the tone data DS exceeds the specific value that gives the maximum recording ratio of dots by the light cyan ink C2, the recording ratio Rt of the light cyan ink C2 starts decreasing. The recording ratio Rn of the cyan ink C1, on the other hand, increases substantially in proportion to an increase in tone data DS. In this example, the recording ratio Rt of the light cyan ink C2 decreases abruptly in the range of tone data DS exceeding 127/255, and is substantially equal to zero in the range of tone data DS exceeding 191/255.

(4) In the range of tone data DS greater than the specific value at which the recording ratio Rt of the light cyan ink C2 becomes substantially equal to zero, the recording ratio Rn of the cyan ink C1 gradually increases to the maximum 100% with an increase in tone data DS. Compared with the previous range, however, the increase in recording ratio against the increase in tone data DS shows a slightly gentle slope in this range.

In the printer 20 of the embodiment discussed above, deep dots by the higher-density ink (the cyan ink C1 in the example of FIG. 13) start formation in the range of tone data smaller than the specific value that gives the maximum recording ratio of light dots by the lower-density ink (the light cyan ink C2 in the example of FIG. 13). This structure enables extremely smooth color mixture on the border between the print with light dots and the print with deep dots, thereby ensuring the extremely high quality of printing.

This structure also restricts the maximum recording ratio of dots by the light ink to approximately 60%. No solid state of the light ink in a lower tone range effectively prevents occurrence of pseudo-contours in this tone range. This structure further gives a high degree of freedom to the distribution of dots by the deep ink and ensures natural expression in the tone range around the border where the higher-density ink starts mixing with the lower-density ink.

In the range of tone data greater than the specific value that gives the maximum recording ratio of dots by the light ink, the recording ratio of dots by the light ink abruptly decreases. As the tone data increases, the dots of the light ink are replaced by the dots of the deep ink. The replacement decreases the number of ink dots required for expressing a certain tone. This saves the amount of ink discharged for expressing the tone and thereby reduces the total amount of ink used for printing. The recording ratio of dots by the light ink abruptly decreases and becomes substantially equal to zero, well before the recording ratio of dots by the deep ink reaches 255/255. This prevents the light ink from being used wastefully in the process of printing the high-tone image area and decreases the total amount of ink discharged for printing. This structure favorably restricts the amount of ink per unit area in the sheet of paper.

In the first embodiment, two different dots having different densities per unit area are formed by the two inks of the same color but different densities. In accordance with one possible application, three or more inks of the same color but different densities may be applied to the structure of the above embodiment. In this case, the ratio of dye densities of these inks may be specified like a geometric series (1:n:2× n:..) or as a relationship of like powers ($1:n^2:n^4$..), wherein n=2,3,.. (positive integer of not smaller than 2). The systematic dither method is used for determining the on/off state of dots in the first embodiment. A variety of other known dither methods may also be applicable to determine the on/off state of deep dots and light dots. Another possible structure gives the priority of determination of the on/off state to the light dots over the deep dots.

Although inks of different densities are used only for cyan and magenta in the embodiment, inks of different densities may also be used for yellow and black. Inks of different densities are not restricted to the combination of C, M, Y, and K but may be applied to another combination. Inks of different densities may be used for special colors, such as gold and silver.

In the first embodiment, dots by the higher-density ink (deep dots) and dots by the lower-density ink (light dots) are formed on the sheet of paper P. Similar effects can, however, be attained by forming two or more different dots in diameter by the same ink having a fixed density. This structure is discussed below as a second embodiment according to the present invention. The size of the dots formed on the sheet of paper P is controlled by regulating the diameter of the nozzle for discharging ink and the intensity of the voltage pulse (that is, the voltage and duration) applied to the piezoelectric element PE. In the second embodiment, for example, the nozzle 62 for the cyan ink C1 and the nozzle 63 for the light cyan ink C2 in the first embodiment are replaced respectively with a nozzle for large-diametral dots and a nozzle for small-diametral dots. The control procedure of the first embodiment is adopted in the second embodiment with slight changes, that is, replacement of deep dots by large-diametral dots and light dots by small-diametral dots. The structure of the second embodiment determines the on/off state of the large-diametral dots according to the input tone data by the dither method and then determines the on/off state of the small-diametral dots based on the error diffusion technique. FIG. 17a through FIG. 17g show the state of forming the large-diametral dots and the small-diametral dots. In the second embodiment, the threshold matrix specifies the sequence of forming the large-diametral dots or the small-diametral dots in a predetermined range of tone data. The concrete procedure of this embodiment accordingly forms the large-diametral dots in the sequence specified by the threshold matrix and then forms the small-diametral dots in the same sequence except the positions at which the large-diametral dots have already been formed.

The second embodiment exerts similar effects as those of the first embodiment, that is, smooth tone expression and easy regulation of the mixing ratio of the large-diametral dots to the small-diametral dots. Another advantage of the second embodiment is that only one ink is required for each color. Formation of the small-diametral dots decreases the amount of ink discharged on the sheet of paper P. This is advantageous from the viewpoint of the ink duty, which represents the allowable amount of ink sprayed per unit area in the sheet of paper P.

The large-diametral dot and the small-diametral dot are not printed at the same position. One preferable structure accordingly uses only one nozzle for printing both the large-diametral dots and the small-diametral dots by varying the intensity of the voltage pulse applied to the piezoelectric clement PE. This structure decreases the number of the nozzles formed in the print head 28 and effectively prevents deviation of the printing positions of the large-diametral dots from those of the small-diametral dots. The structure of varying the dot diameter is also applicable to three or more different dots in diameter. The determination of formation of the large-diametral dots may precede or follow the determination of formation of the small-diametral dots.

Figure 18:
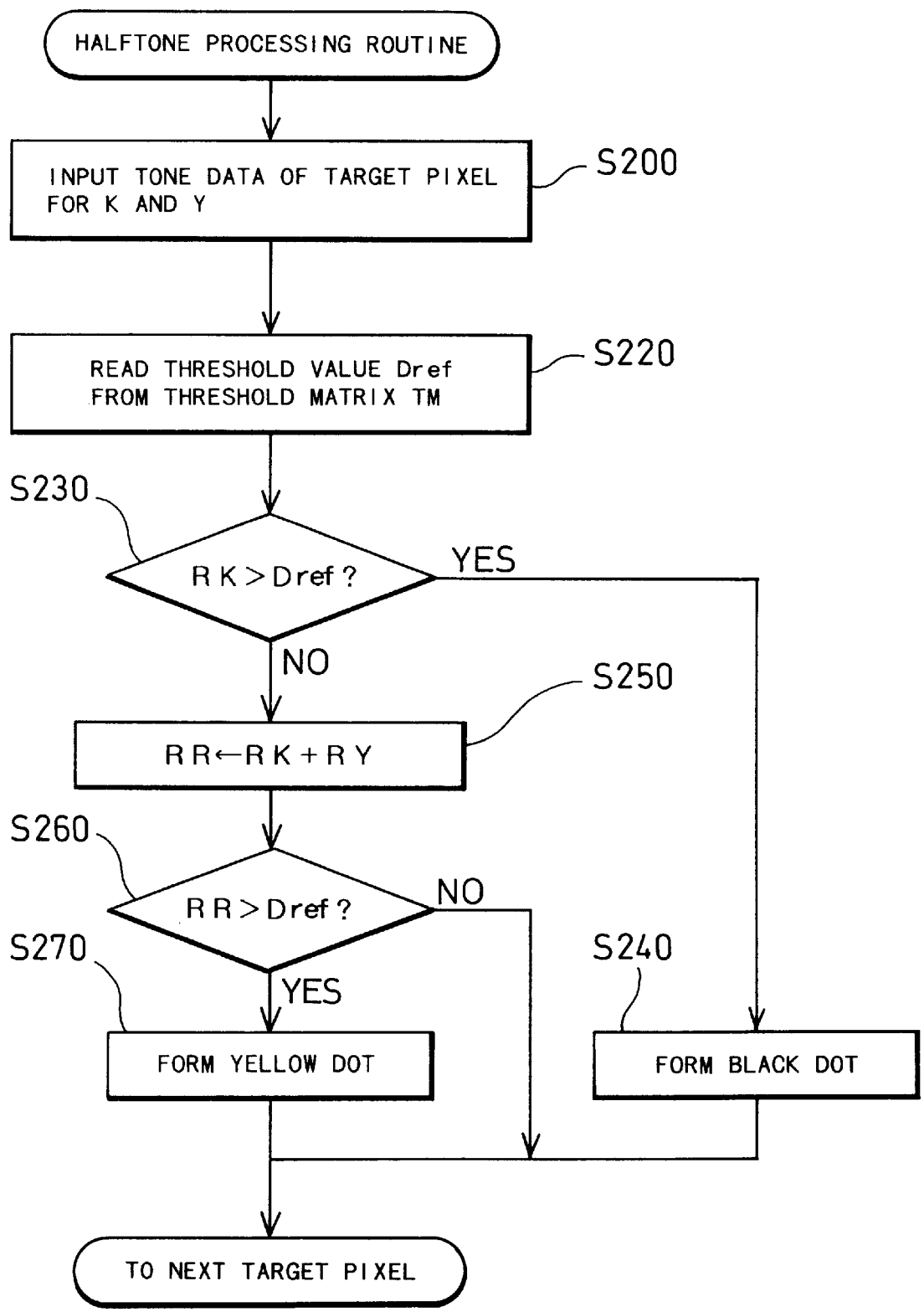
FIG. 18 is a flowchart showing a halftone processing routine regarding two inks having different hues as a third embodiment according to the present invention.

The following describes a third embodiment according to the present invention. The printing system of the third embodiment determines the on/off state of dots by the black ink and dots by the yellow ink based on the same dither matrix TM. FIG. 18 is a flowchart showing a dither-based halftone processing routine executed by the halftone module 99 in the third embodiment. When a printing process starts, pixels are successively scanned from the upper left corner of one image set as the origin. The halftone module 99 receives color-corrected tone data (8 bits respectively for C, M, Y, and K) of a target pixel in the order along the scanning direction of the carriage 30 from the color correction module 98 at step S200. In the following procedure, determination of the on/off state is carried out only for dots by the black ink K and those by the yellow ink Y. Formation of dots by the cyan ink C and the magenta ink M are thus not specifically described here.

At subsequent step S220, the halftone module 99 refers to a threshold matrix TM for the dither-based halftone processing. Namely a threshold value Dref used for determining the on/off state of dots by the black ink K is read from the threshold matrix TM. The threshold value Dref is a reference value for determining whether or not a dot should be formed by the black ink K in a target pixel and may be fixed to one value, for example, 127. In this embodiment, however, systematic dither method using a threshold matrix of discrete dither is applied to set the threshold value Dref. The threshold matrix of discrete dither used here is, for example, a wide-range matrix of 64×64 in size (blue noise matrix). Different threshold values Dref used for determining the on/off state of dots by the black ink K are accordingly set for the respective target pixels. The dither matrix used in the third embodiment is identical with the discrete blue noise matrix used in the first embodiment.

After referring to the threshold matrix TM and reading the threshold value Dref of the target pixel at step S220, the program compares a recording ratio RK of dots by the black ink K with the threshold value Dref with respect to the target pixel at step S230. In case that the recording ratio RK of dots by the black ink K is not smaller than the threshold value Dref, the program goes to step S240 to form a dot by the black ink K at the position corresponding to the target pixel. This concludes the halftone processing for one target pixel.

In case that the recording ratio RK of dots by the black ink K is smaller than the threshold value Dref, on the contrary, the program goes to step S250 to correct a recording ratio RY of dots by the yellow ink Y and give a corrected recording ratio RR, with a view to determining the on/off state of dots by the yellow ink Y. In this embodiment, the recording ratio RY of dots by the yellow ink Y is corrected by adding the recording ratio RK of dots by the black ink K to the recording ratio RY of dots by the yellow ink Y. Alternatively the recording ratio RY of dots by the yellow ink Y may be corrected by subtracting the recording ratio RK of dots by the black ink K from the corresponding threshold value Dref.

The corrected recording ratio RR of dots by the yellow ink Y is then compared with the threshold value Dref used for determining the on/off state of dots by the black ink K at step S260. In this embodiment, since the recording ratio RY of dots by the yellow ink Y is corrected, the threshold value Dref read at step S220 is not required changing but is used without any correction. In case that the corrected recording ratio RR of dots by the yellow ink Y is not smaller than the threshold value Dref, the program proceeds to step S270 to form a dot by the yellow ink Y at the position corresponding to the target pixel. This concludes the halftone processing for one target pixel. In case that the recording ratio RR is smaller than the threshold value Dref, on the other hand, the processing for the target pixel is concluded without formation of any dots. After conclusion of the processing for one target pixel, the program goes to a next target pixel and repeats the processing of steps S200 through S270 for the next target pixel. Such halftone processing forms dots by the black ink K and dots by the yellow ink Y without any overlaps.

The same threshold matrix is used for determining the on/off state of both the dots by the yellow ink Y and the dots by the black ink K. The determination of the on/off state of dots by the yellow ink Y is based on the corrected recording ratio RR, which is obtained by adding the recording ratio RK of dots by the black ink K to the recording ratio RY of dots by the yellow ink Y. It is considered that the threshold matrix specifies the sequence of turning the dots on in response to an increase in tone, when the tone of a predetermined range corresponding to the threshold matrix is gradually increased. The concrete procedure of this embodiment accordingly turns on the dots by the black ink K in the sequence specified by the threshold matrix and then turns on the dots by the yellow ink Y in the same sequence except the positions at which dots have already been formed by the black ink K. This procedure ensures not only the good dispersibility of dots by the black ink K but the good dispersibility in combination of both the dots by the black ink K and the yellow ink Y. Dots by the black ink K are naturally more prominent than dots by the yellow ink Y having the higher lightness, so that the process of the embodiment gives the priority to the dispersibility of dots by the black ink K and determines the on/off state of dots by the yellow ink Y in order to attain the good dispersibility in combination of both the yellow dots and the black dots.

The processing of the third embodiment prevents the dots by the yellow ink Y from overlapping the dots by the black ink K and thereby enables the color of the yellow ink Y to be sufficiently developed. No overlap of yellow dots with black dots means that the sum of the recording ratios of dots by the black ink K and the yellow ink Y does not exceed 100[%] (255/255 in this embodiment). There are generally no cases, in which the dots by the black ink K are to be formed upon the dots by another color ink having the higher lightness. In some colors, however, it is desirable that the sum of the recording ratios of two different dots exceeds 100[%]. By way of example, when the color of deep blue is printed by the dots of the cyan ink C and the dots of the magenta ink M, it may be desirable that the sum of the recording ratios of these dots exceeds 100[%]. In this case, the flow of FIG. 18 is modified as discussed below.

In the structure of the third embodiment, the recording ratio RY of dots by the yellow ink Y is corrected at step S250, in order to prevent the dots of the yellow ink Y from overlapping the dots of the black ink K. In the modified structure, this step is replaced by the process of correcting the threshold value Dref as:

$$Drefr \leftarrow Dmax-Dref+1$$

where Dmax denotes the maximum threshold value in the threshold matrix. The correction by the above equation accordingly reverses the order of formation of dots in the threshold matrix that is used for the black ink K in the third embodiment. With respect to the same dither matrix, dots by the black ink K are formed in the sequence of the threshold values, whereas dots by the yellow ink Y are formed in the reverse sequence of the threshold values.

In case that the sum of the recording ratios of dots by the black ink K and the yellow ink Y exceeds 100[%], dots are formed by both the black ink K and the yellow ink Y. The modified structure discussed above is applicable to the case, in which the sum of the recording ratios of two different dots should exceed 100[%]. This structure is not restricted to the black ink K and the yellow ink Y, but is applicable to any two colors selected among the cyan ink C, the magenta ink M, and the yellow ink Y. When the sum of the recording ratios of two different dots is relatively low, the dots are formed in a non-overlapping manner, When the sum of the recording ratios of the two dots exceeds 100[%], on the other hand, the two dots are formed at the same position. This structure is applicable to any combination of inks of different hues, other than cyan C, magenta M, and yellow Y.

The modified structure determines the on/off state of dots by the yellow ink Y in the reverse sequence of the threshold values. In order to ensure the continuity of the dispersibility of dots based on the identical threshold matrix, another preferable structure determines the on/off state of the second dots by the technique of the third embodiment shown in the flowchart of FIG. 18 in the area where the sum of the recording ratios of two different dots does not exceed 100[%], and uses the threshold matrix including the threshold values of the reversed magnitude in order to determine the on/off state of the second dots in the area where the sum of the recording ratios of two different dots exceeds 100[%].

Figure 19:
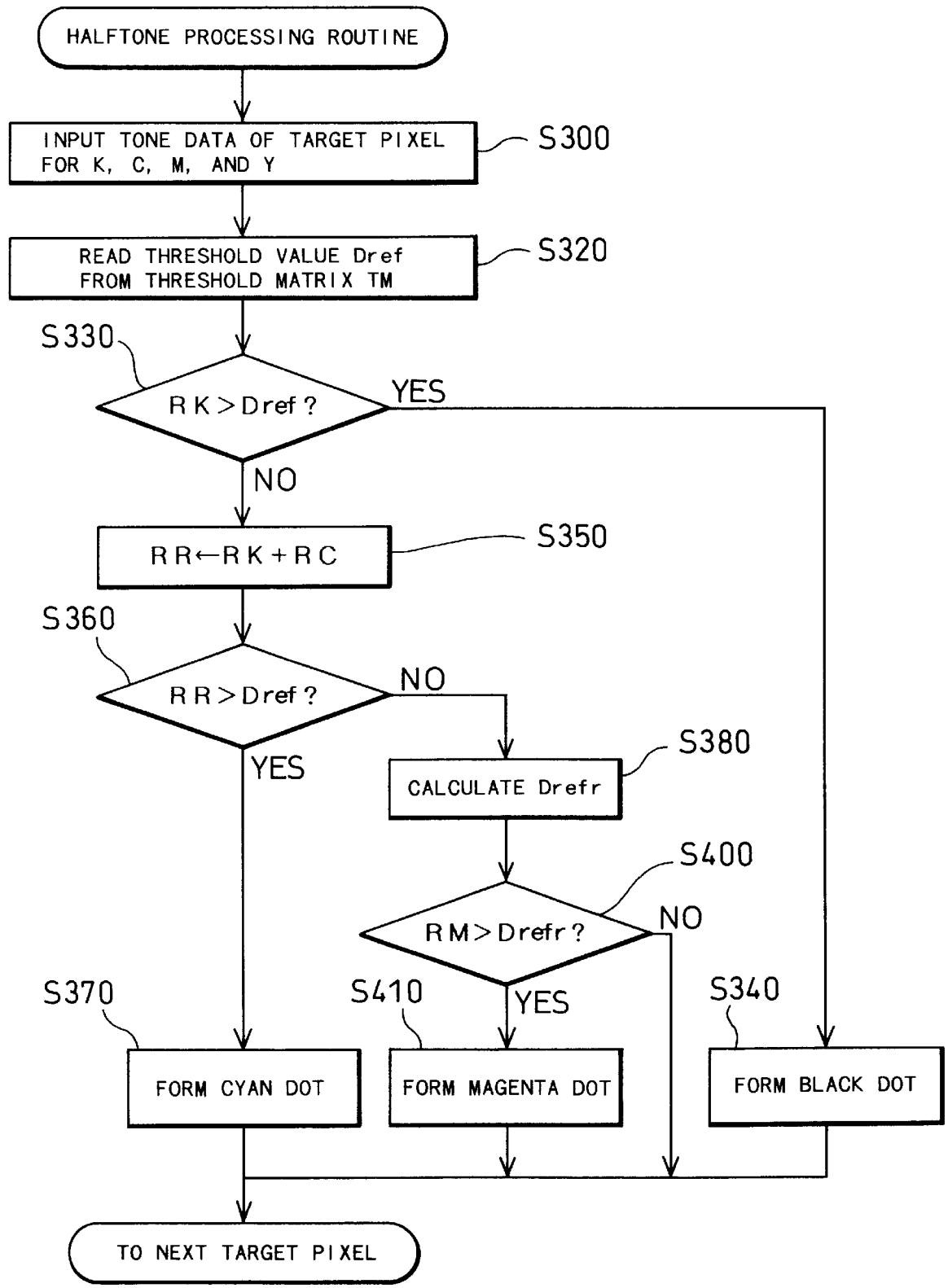
FIG. 19 is a flowchart showing a halftone processing routine regarding three inks having different hues as a fourth embodiment according to the present invention.

FIG. 19 is a flowchart showing a halftone processing routine carried out in a fourth embodiment according to the present invention. The fourth embodiment uses one dither matrix to determine the on/off state of dots by the black ink K, the cyan ink C, and the magenta ink M. The printer 20 used in the fourth embodiment has neither the light cyan ink C2 nor the light magenta ink M2 and prints images in four color inks, that is, black K, cyan C, magenta M, and yellow Y. When the program enters the routine of FIG. 19, the halftone module 99 first receives tone data of a target pixel for the respective color inks and determines the corresponding recording ratios at step S300, and refers to the threshold matrix TM to read the threshold value Dref at step S320. The program subsequently determines formation or non-formation of a dot by the black ink K at steps S330 and S340 and formation or non-formation of a dot by the cyan ink C at steps S350 through S370. The process of determining the on/off state of dots by the black ink K and the cyan ink C is identical with the formation of dots by the black ink K and the yellow ink Y discussed in the third embodiment. After the determination regarding a dot by the black ink K, a recording ratio RC of dots by the cyan ink C is corrected with the recording ratio RK of dots by the black ink K. The same dither matrix is accordingly used to form dots of the black ink K and the cyan ink C in a non-overlapping manner. In this embodiment, no dot is formed by the cyan ink C at the position where a dot has already been formed by the black ink K at steps S330 and S340. This is because the dot of the black ink K includes the hue expressed by the dot of the cyan ink C.

Figure 20:
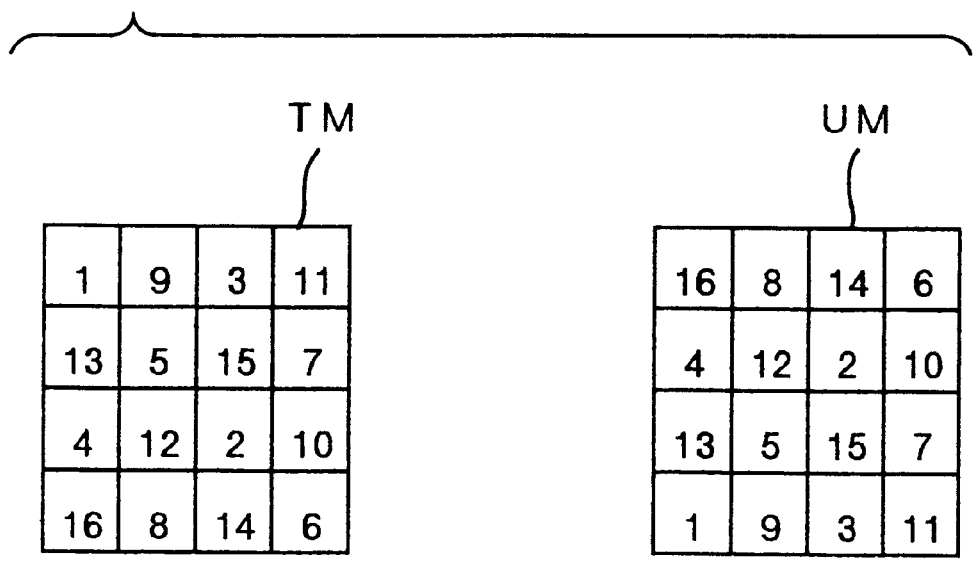
FIG. 20 shows a normal threshold matrix TM and a reverse threshold matrix UM, wherein the order of formation of dots is reversed.

After determining non-formation of dots by the black ink K and the cyan ink C, the program reverses the magnitude of the threshold values Dref in the threshold matrix TM at step S380. A concrete procedure of step S380 reverses the order of formation of dots in the original threshold matrix TM by the equation of Drefr←Dmax+1−Dref. FIG. 20 shows the original threshold matrix TM and a reverse threshold matrix UM obtained by the above procedure. Dmax denotes the maximum threshold value in the threshold matrix and is equal to 16 in the 4×4 threshold matrix TM of FIG. 20.

The program then compares a recording ratio RM of dots by the magenta ink M with the reverse threshold value Drefr at step S400, in order to determine formation or non-formation of a dot by the magenta ink M. Since the reverse threshold matrix UM is used for the magenta ink M, when the recording ratio RM is greater than the reverse threshold value Drefr, a dot is formed by the magenta ink M in the target pixel at step S410. The program then shifts to a next target pixel and repeats the processing of step S300 through S410 for the next target pixel.

Figures 21A, 21B, 21C, 21D:
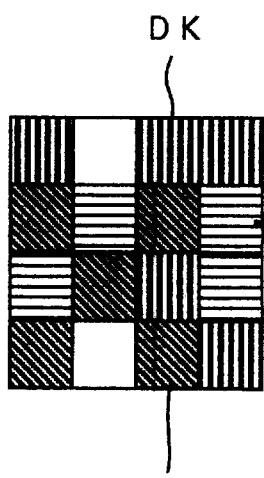
FIG. 21A through FIG. 21D show a process of formation of dots in the fourth embodiment.
Figure 22A:
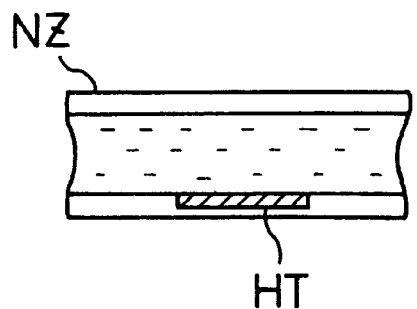
FIGS. 22A through 22E show another mechanism for discharging ink particles.
Figure 22B:
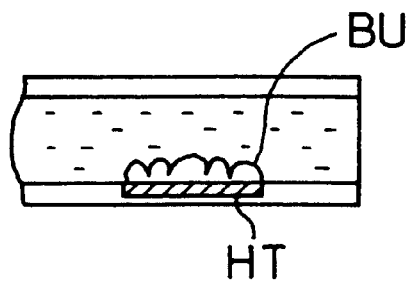
Figure 22C:
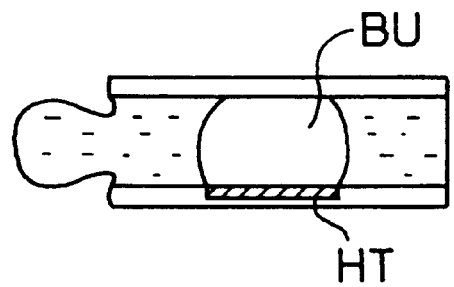
Figure 22D:
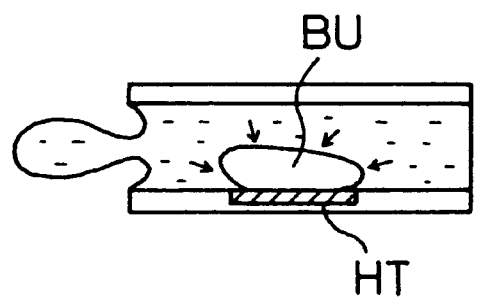
Figure 22E:
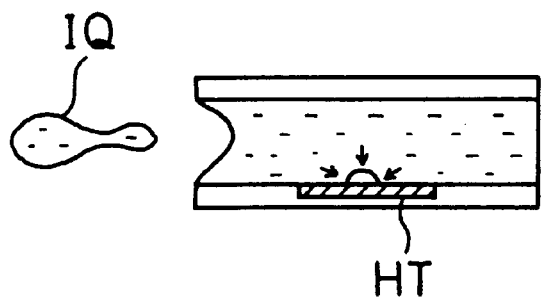

By way of example, it is assumed that the recording ratios of dots by the black ink K, the cyan ink C, and the magenta ink M are specified as shown in FIG. 21A. The recording ratio RC of dots by the cyan ink C is corrected to give the corrected recording ratio RR shown in FIG. 21B. The corrected recording ratio RR of the cyan ink C and the recording ratio RM of the magenta ink M are respectively compared with the original threshold matrix TM and the reverse threshold matrix UM shown in FIG. 21C. This procedure results in formation of dots DK by the black ink K, dots DC by the cyan ink C, and dots DM by the magenta ink M in a non-overlapping manner as shown in FIG. 21D. This characteristic is ascribed to the following:

(1) No dot of the cyan ink C or the magenta ink M is formed at the position where a dot of the black ink K has already been formed.

(2) The recording ratio RC of the cyan ink C is corrected by adding the recording ratio RK of the black ink K.

(3) The threshold matrix UM used for determining the order of formation of dots by the magenta ink M is just the reverse of the threshold matrix TM used for determining the order of formation of dots by the cyan ink C.

In case that the sum of the recording ratios of two inks, for example, the cyan ink C and the magenta ink M, is extremely large, however, it is desirable that dots are formed by both the cyan ink C and the magenta ink M in the same pixel. When the ink duty of the paper allows formation of both dots, two dots are formed in the pixel. When the ink duty does not allow formation of both dots, on the contrary, only one dot is formed in the pixel. In this embodiment, dots of the yellow ink Y are formed at the positions where no dots have yet been formed by the black ink K, the cyan ink, or the magenta ink M.

The structure of the fourth embodiment uses the reverse threshold matrix to determine the on/off state of the third dots, which is just the reverse of the threshold matrix used to determine the on/off state of the second dots. In accordance with another possible procedure, an independent processing routine may be carried out to determine the on/off state of the third dots. In accordance with still another possible procedure, the technique of the second embodiment may be adopted to determine the on/off state of the third dots (dots by the magenta ink M in the fourth embodiment) and the fourth dots (dots by the yellow ink Y in the fourth embodiment).

In the first through the fourth embodiments discussed above, the program of controlling formation of deep dots and light dots or dots of different diameters and the program of controlling formation of dots having different hues are stored not in the printer 20 but in the printer driver 96 of the computer 90. These programs may, however, be stored in the printer 20. In the latter case, the computer 90 sends image information written in a language, such as PostScript, and the printer 20 has the halftone module 99 and the other required elements. In the above embodiments, the software realizing these functions is stored in the hard disk 16 of the computer 90 and incorporated into the operating system in the form of the printer driver at the time of activation of the computer 90. In accordance with another possible application, the software may be stored in a portable storage medium (carriable storage medium), such as floppy disks and CD-ROMs and transferred from the storage medium to the main memory of the computer system or an external storage device. The software may be transferred from the computer 90 to the printer 20. In case that the printing system 10 includes an apparatus for supplying the software via a communication line, the contents of the halftone module may be transferred to either the computer 90 or the printer 20 via the communication line.

In the above embodiments, a predetermined voltage is applied to the piezoelectric elements PE for a predetermined time period, in order to discharge a plurality of different dots having different characteristics. Another method is, however, applicable to discharge inks. The available ink-discharge techniques can be classified into two types; that is, the method of separating ink particles from a continuous jet stream of ink and the on-demand method applied in the above embodiments. The former type includes a charge modulation method that separates droplets of ink from a jet stream of ink by means of charge modulation and a micro-dot method that utilizes fine satellite particles produced in the process of separating large-diametral particles from a jet stream of ink. These methods are also applicable to the printing system of the present invention that forms a plurality of different dots having different densities, different diameters, or different hues.

The on-demand type, on the other hand, produces ink particles for the respective dot units according to the requirements. A method included in the on-demand type, other than the method utilizing the piezoelectric elements applied in the above embodiments, arranges a heating body HT in the vicinity of nozzles NZ of ink, produces bubbles BU by heating ink, and makes ink particles IQ discharged by the pressure of the bubbles BU as shown in FIGS. 22A through 22E. Such on-demand type methods are also applicable to the printing system of the present invention −+23, that forms a plurality of different dots having different densities, different diameters, or different hues.

Although the printing systems of the above embodiments are printers that are operable alone, the principle of the present invention is applicable to any printing systems incorporated in a variety of apparatuses, such as digital copying machines and facsimiles. The principle of the present invention is also applicable to any printing systems that record images by dots, for example, thermal transfer printers, thermal sublimation printers, and color laser printers, other than the ink jet printers discussed in the above embodiments.

The right of the present invention covers the resulting prints, on which dots are recorded in any manner discussed in the above embodiments. Sequential analysis of the recording state of dots on a print from the low density area to the high density area shows that one dither matrix is used to form a plurality of different dots in a non-overlapping manner while maintaining the continuity of dispersibility of the dots. Such prints can be obtained only by the image recording method of the present invention.

The present invention is not restricted to the above embodiments or their modified examples, but there may be many other modifications, changes, and alterations without departing from the scope or spirit of the main characteristics of the present invention.

It should be clearly understood that the above embodiments are only illustrative and not restrictive in any sense. The scope and spirit of the present invention are limited only by the terms of the appended claims.

What is claimed is:

1. A printing system having a head, from which inks are dischargeable to record at least two different dots having different characteristics on an object, and recording a multi-tone image by a distribution of said at least two different dots, said printing system comprising:

input means for successively receiving a tone signal of each pixel included in an image to be printed;

recording ratio setting means for specifying recording ratios of said at least two different dots having different characteristics with respect to said each pixel, based on said input tone signal;

first dot formation determination means for comparing the recording ratio specified for a first dot among said at least two different dots having different characteristics with a threshold value corresponding to said each pixel and read from a threshold matrix, which corresponds to a dither pattern provided in advance, in order to determine whether or not said first dot is to be formed at a position corresponding to said each pixel;

second dot formation determination means for comparing the recording ratio specified for a second dot among said at least two different dots having different characteristics with the threshold value of said threshold matrix, in order to determine whether or not said second dot is to be formed at a position corresponding to said each pixel, except positions corresponding to the pixels where formation of said first dot has been determined; and head driving means for driving said head to form said at least two different dots having different characteristics, based on the results of determination by said first dot formation determination means and said second dot formation determination means.

2. A printing system in accordance with claim 1, wherein said second dot formation determination means corrects the recording ratio of said second dot with the recording ratio of said first dot used for the comparison in said first dot formation determination means, and compares the corrected recording ratio with the threshold value of said threshold matrix, in order to determine whether or not said second dot is to be formed at a position corresponding to said each pixel, except positions corresponding to the pixels where formation of said first dot has been determined.

3. A printing system in accordance with claim 2, wherein said second dot formation determination means corrects the recording ratio of said second dot by adding the recording ratio of said first dot used for the comparison in said first dot formation determination means to the recording ratio of said second dot.

4. A printing system in accordance with claim 1, wherein said second dot formation determination means subtracts a value corresponding to the recording ratio of said first dot used for the comparison in said first dot formation determination means from the corresponding threshold value of said threshold matrix to give a corrected threshold matrix, and compares the recording ratio of said second dot with the corrected threshold value of said corrected threshold matrix, in order to determine whether or not said second dot is to be formed at a position corresponding to said each pixel, except positions corresponding to the pixels where formation of said first dot has been determined.

5. A printing system in accordance with claim 1, wherein said second dot formation determination means reverses the magnitude of the threshold values in said threshold matrix to give a reverse threshold matrix, and compares the recording ratio of said second dot with the reverse threshold value of said reverse threshold matrix, in order to determine whether or not said second dot is to be formed at a position corresponding to said each pixel, except positions corresponding to the pixels where formation of said first dot has been determined.

6. A printing system in accordance with claim 5, wherein said second dot formation determination means comprises
  total recording ratio judgement means for determining whether or not a sum of the recording ratio of said first dot used for the determination by said first dot formation determination means and the recording ratio of said second dot used for the determination by said second dot formation determination means exceeds 100[%],
  wherein the recording ratio of said second dot is compared with the reverse threshold value of said reverse threshold matrix, when said total recording ratio judgement means determines that the sum of the recording ratios of said first dot and said second dot exceeds 100[%].

7. A printing system in accordance with claim 1, wherein said at least two different dots having different characteristics are at least two different dots having different densities per unit area,
  said head forming said at least two different dots having different densities per unit area.

8. A printing system in accordance with claim 1, wherein said at least two different dots having different characteristics are at least two different dots having different hues,
  at least two inks of different hues being dischargeable from said head to form said at least two different dots having different hues.

9. A printing system in accordance with claim 1, wherein said threshold matrix used by said first dot formation determination means and said second dot formation determination means is a discrete threshold matrix.

10. A printing system in accordance with claim 1, wherein said head comprises a mechanism for discharging ink particles under a pressure applied to each ink running through an ink conduit by application of a voltage to a piezoelectric element arranged in said ink conduit.

11. A printing system in accordance with claim 1, wherein said head comprises a mechanism for discharging ink particles under a pressure applied to each ink running through an ink conduit by air bubbles that are produced by a supply of electricity to a heating body arranged in said ink conduit.

12. A printing system in accordance with claim 7, wherein said first dot formation determination mean carries out the determination for a dot having a higher density per unit area among said at least two different dots having different densities per unit area.

13. A printing system in accordance with claim 7, wherein said first dot formation determination means carries out the determination for a dot having a lower density per unit area among said at least two different dots having different densities per unit area.

14. A printing system in accordance with claim 7, wherein said at least two different dots having different densities per unit area are recorded by at least two inks of different densities, said at least two inks of different densities comprising a high-density ink and a low density ink and a dye density of said low-density ink being approximately one quarter a dye density of said high-density ink.

15. A printing system in accordance with claim 14, wherein said head discharges said high-density ink and said low-density ink for at least either one of cyan and magenta.

16. A printing system in accordance with claim 7, wherein said head forms at least two different dots having different diameters.

17. A printing system in accordance with claim 8, wherein said first dot formation determination means carries out the determination for a dot having a hue of greater visual effect among said at least two different dots having different hues.

18. A printing system in accordance with claim 8, wherein said head records an image by dots in at least cyan, magenta, yellow, and black inks,
  said first dot formation determination means carrying out the determination for a dot of said black ink among said at least two different dots having different hues,
  said second dot formation determination means carrying out the determination for a dot of said yellow ink among said at least two different dots having different hues.

19. A printing system in accordance with claim 8, wherein said head records an image by dots in at least cyan, magenta, yellow, and black inks,
  said first dot formation determination means carrying out the determination for a dot of said black ink among said at least two different dots having different hues,
  said second dot formation determination means carrying out the determination for a dot of said magenta ink or said cyan ink among said at least two different dots having different hues.

20. A printing system in accordance with claim 19, said printing system further comprising:
  third dot formation determination means for determining whether or not third dots are to be formed by an ink of another hue after the determination by said second dot formation determination means, said another hue being different from the hue of said ink that is subjected to the determination by said second dot formation determination means; and
  dot position determination means for, when said third dot formation determination means determines formation of said third dots by said ink of another hue, reading the threshold values from said threshold matrix in a reverse order of magnitude, so as to determine positions of said third dots.

21. A printing system in accordance with claim 20, said printing system further comprising:

yellow dot formation determination means for determining whether or not yellow dots are to be formed by said yellow ink; and yellow dot position determination means for, when said yellow dot formation determination means determines formation of said yellow dots by said yellow ink, determining positions of said yellow dots, in order to avoid an overlap with positions of black dots by said black ink that are subjected to the determination by said first dot formation determination means.

22. An image recording method for recording a multi-tone image by a distribution of at least two different dots having different characteristics in a printing system with a head, from which inks are dischargeable to record said at least two different dots having different characteristics on an object, said method comprising the steps of:

(a) successively receiving a tone signal of each pixel included in an image to be printed;

(b) specifying recording ratios of said at least two different dots having different characteristics with respect to said each pixel, based on said input tone signal;

(c) comparing the recording ratio specified for a first dot among said at least two different dots having different characteristics with a threshold value corresponding to said each pixel and read from a threshold matrix, which corresponds to a dither pattern provided in advance, in order to determine whether or not said first dot is to be formed at a position corresponding to said each pixel;

(d) comparing the recording ratio specified for a second dot among said at least two different dots having different characteristics with the threshold value of said threshold matrix, in order to determine whether or not said second dot is to be formed at a position corresponding to said each pixel, except positions corresponding to the pixels where formation of said first dot has been determined; and (e) driving said head to form said at least two different dots having different characteristics, based on the results of determination in said step (c) and said step (d).

23. An image recording method in accordance with claim 22, wherein said step (d) corrects the recording ratio of said second dot with the recording ratio of said first dot used for the comparison in said step (c), and compares the corrected recording ratio with the threshold value of said threshold matrix, in order to determine whether or not said second dot is to be formed at a position corresponding to said each pixel, except positions corresponding to the pixels where formation of said first dot has been determined.

24. Computer program product for driving a head of a printing system, from which inks are dischargeable to record at least two different dots having different characteristics on an object, said computer program product comprising:

a computer readable medium; and computer program code means stored on said computer readable medium, said computer program code means storing at least part of a program for recording a multi-tone image by a distribution of said at least two different dots, said computer program code means comprising:

first program code means for causing said computer to realize:

second program code means for successively receiving a tone signal of each pixel included in an image to be printed;

third program code means for specifying recording ratios of said at least two different dots having different characteristics with respect to said each pixel, based on said input tone signal;

forth program code means for comparing the recording ratio specified for a first dot among said at least two different dots having different characteristics with a threshold value corresponding to said each pixel and read from a threshold matrix, which corresponds to a dither pattern provided in advance, in order to determine whether or not said first dot is to be formed at a position corresponding to said each pixel; and fifth program code means for comparing the recording ratio specified for a second dot among said at least two different dots having different characteristics with the threshold value of said threshold matrix, in order to determine whether or not said second dot is to be formed at a position corresponding to said each pixel, except positions corresponding to the pixels where formation of said first dot has been determined.

* * * * *